(12) United States Patent
Umemoto et al.

(10) Patent No.: US 8,771,463 B2
(45) Date of Patent: Jul. 8, 2014

(54) CELLULOSE FIBER ASSEMBLY AND METHOD FOR PREPARING THE SAME, FIBRILLATED CELLULOSE FIBERS AND METHOD FOR PREPARING THE SAME, AND CELLULOSE FIBER COMPOSITE

(75) Inventors: Tomokazu Umemoto, Kanagawa (JP); Hideko Akai, Kanagawa (JP); Yasutomo Noishiki, Tokyo (JP); Go Banzashi, Tokyo (JP)

(73) Assignee: Oji Holdings Corporation, Chuo-ku, Tokyo (JP)

( * ) Notice: Subject to any disclaimer, the term of this patent is extended or adjusted under 35 U.S.C. 154(b) by 0 days.

(21) Appl. No.: 13/885,741

(22) PCT Filed: Nov. 15, 2011

(86) PCT No.: PCT/JP2011/076304
§ 371 (c)(1),
(2), (4) Date: Jun. 12, 2013

(87) PCT Pub. No.: WO2012/067113
PCT Pub. Date: May 24, 2012

(65) Prior Publication Data
US 2013/0284387 A1    Oct. 31, 2013

(30) Foreign Application Priority Data
Nov. 16, 2010    (JP) .................................. 2010-256051

(51) Int. Cl.
*D21C 9/00*    (2006.01)
(52) U.S. Cl.
USPC .................. 162/9; 162/78; 162/141; 162/231

(58) Field of Classification Search
USPC ................ 162/9, 78, 141, 231; 428/339, 332; 427/389.9; 442/59, 340
See application file for complete search history.

(56) References Cited

U.S. PATENT DOCUMENTS

2006/0207732 A1    9/2006    Miyawaki et al.
2009/0305033 A1*   12/2009   Yano et al. .................... 428/339

FOREIGN PATENT DOCUMENTS

| JP | 2008-248425 A | 10/2008 |
| JP | 2009-155772 A | 7/2009 |
| JP | 2009-299043 A | 12/2009 |
| JP | 2010-222536 A | 10/2010 |
| WO | 2004-042139 A1 | 5/2004 |

OTHER PUBLICATIONS

International Search Report issued in corresponding International Application No. PCT/JP2011/076304 mailed Jan. 31, 2012.

* cited by examiner

*Primary Examiner* — Mark Halpern
(74) *Attorney, Agent, or Firm* — Banner & Witcoff, Ltd.

(57) ABSTRACT

An object of the present invention is to provide a cellulose fiber assembly and a cellulose fiber composite, each having low coloration. The present invention is directed to a method for preparing a fibrillated cellulose fiber assembly, in which the cellulose fiber raw materials are subjected to a fibrillation treatment and a reduction treatment. The present invention provides a method for preparing a cellulose fiber assembly, comprising a fibrillation step of fibrillating cellulose fiber raw materials to obtain fibrillated cellulose fibers, an assembly preparation step of obtaining a cellulose fiber assembly using the fibrillated cellulose fibers, and a step of carrying out a reduction treatment. Further, the present invention provides a cellulose fiber composite comprising the prepared cellulose fiber assembly and a matrix material.

16 Claims, No Drawings

CELLULOSE FIBER ASSEMBLY AND METHOD FOR PREPARING THE SAME, FIBRILLATED CELLULOSE FIBERS AND METHOD FOR PREPARING THE SAME, AND CELLULOSE FIBER COMPOSITE

This application is a 371 of PCT/JP2011/076304 filed 15 Nov. 2011

TECHNICAL FIELD

The present invention relates to a cellulose fiber assembly and a method for preparing the same, fibrillated cellulose fibers and a method for preparing the same, and a cellulose fiber composite. Specifically, the present invention relates to a cellulose fiber assembly capable of providing a cellulose fiber composite having low coloration and a method for preparing the same, fibrillated cellulose fibers and a method for preparing the same, and a cellulose fiber composite using the cellulose fiber assembly prepared using the method of the present invention.

BACKGROUND ART

Composite materials using microfibers of cellulose have recently been investigated enthusiastically. It is known that cellulose exhibits a low coefficient of linear expansion, a high modulus of elasticity, and a high strength due to the extended chain crystals thereof. In addition, cellulose has attracted an attention as a material that exhibits high transparency when microfibrillated to give a composite material.

For example, PTL 1 discloses a method for preparing microfibrillated cellulose fibers by subjecting cellulose fiber raw materials composed of purification-treated wood flour to a fibrillation treatment using an ultrahigh pressure homogenizer. Further, PTL 2 discloses a method for preparing microfibrillated cellulose fibers by carrying out a fibrillation treatment using an ultrasonic irradiation apparatus.

CITATION LIST

Patent Literature

[PTL 1] JP-A-2009-155772
[PTL 2] JP-A-2009-299043

SUMMARY OF INVENTION

Technical Problem

However, composite materials of the cellulose fibers prepared using fibrillated cellulose fibers obtained by the preparation methods described in PTLs 1 and 2 have a problem that they undergo high coloration when heated.

Examples of the typical applications of a fibrillated cellulose composite having high transparency, non-coloration, and a low coefficient of linear expansion include transparent substrate materials for electric/electronic devices typified by a flat panel display, an organic LED illumination, a solar light electricity generation panel, and the like, but in the preparation steps for these devices, it may be necessary to subject the transparent substrate material to a heating treatment. Therefore, in particular, in these applications, the materials that undergo coloration by a heating treatment are not preferable.

An object of the present invention is to provide technology capable of providing a cellulose fiber assembly and a cellulose fiber composite, each of which has a low coloration by a heating treatment.

Solution to Problem

The present inventors have made extensive studies, and as a result, they have found that the coloration of a cellulose fiber assembly obtained and a cellulose fiber composite prepared using the same is reduced by carrying out a reduction treatment of cellulose in any of the preparation steps until the cellulose fiber assembly is obtained from the cellulose fiber raw materials, thereby completing the present invention.

That is, the present invention is as follows.

1. A method for preparing a cellulose fiber assembly, including:
a fibrillation step of fibrillating cellulose fiber raw materials to obtain fibrillated cellulose fibers,
an assembly preparation step of obtaining a cellulose fiber assembly using the fibrillated cellulose fiber, and
a step of carrying out a reduction treatment.
2. The method for preparing a cellulose fiber assembly as described in 1, in which the cellulose fiber assembly obtained in the assembly preparation step is subjected to the reduction treatment.
3. The method for preparing a cellulose fiber assembly as described in 1 or 2, further including a step of carrying out a chemical modification treatment.
4. A cellulose fiber assembly prepared by the method for preparing a cellulose fiber assembly as described in any one of 1 to 3.
5. A cellulose fiber composite including the cellulose fiber assembly as described in 4 and a matrix material.
6. A method for preparing fibrillated cellulose fibers, in which cellulose fiber raw materials are subjected to a fibrillation treatment, a reduction treatment, and a chemical modification treatment.
7. Fibrillated cellulose fibers prepared by the method for preparing fibrillated cellulose fibers as described in 6.
8. A cellulose fiber composite including the fibrillated cellulose fibers as described in 7 and a matrix material.

Advantageous Effects of Invention

According to the preparation method of the present invention, a cellulose fiber assembly and a cellulose fiber composite, each of which has low coloration and inhibition of an increase in the coloration even when being heating-treated can be obtained.

DESCRIPTION OF EMBODIMENTS

The embodiments of the present invention are described in detail below, but the description on the configuration requirements described below is an example (typical example) of the embodiments of the present invention, and accordingly, the present invention is not limited to these contents.

The present invention relates to a method for preparing fibrillated cellulose fibers, including subjecting cellulose fiber raw materials to a fibrillation treatment, a reduction treatment, and a chemical modification treatment; and a cellulose fiber composite including fibrillated cellulose fibers prepared by the method for preparing the same and a matrix material.

Furthermore, the present invention relates to a method for preparing a cellulose fiber assembly, including a fibrillation step of fibrillating cellulose fiber raw materials to obtain fibrillated cellulose fibers, an assembly preparation step of obtaining a cellulose fiber assembly using the fibrillated cellulose fibers, and a step of carrying out a reduction treatment; and a cellulose fiber composite including a cellulose fiber assembly prepared by the method for preparing the same and a matrix material.

1. Method for Preparation Fibrillated Cellulose Fibers

First, the method for preparing fibrillated cellulose fibers of the present invention will be described.

The method for preparing fibrillated cellulose fibers of the present invention may include subjecting cellulose fiber raw materials to a fibrillation treatment, a reduction treatment, and a chemical modification treatment.

Here, the fibrillated cellulose fibers are usually obtained in a dispersion state where the fibrillated cellulose fibers are dispersed. That is, in this case, the fibrillated cellulose fibers obtained by the preparation method of the present invention refer to fibrillated cellulose fibers including a dispersion in which the fibrillated cellulose fibers are dispersed.

A cellulose fiber assembly is prepared using fibrillated cellulose fibers prepared by the preparation method of the present invention, and a cellulose fiber composite as described later may be obtained using the assembly.

The cellulose fiber composite prepared by using the fibrillated cellulose fibers prepared by the preparation method of the present invention has low coloration, and is suitably used for substrates of electric/electronic devices such as a flat display, an organic LED illumination, and a solar light electricity generation.

<Cellulose Fiber Raw Materials>

In the present invention, the cellulose fiber raw materials are those obtained by removing impurities through a general purification step from the cellulose-containing substance shown below.

(Cellulose-Containing Substance)

Examples of the cellulose-containing substance include woods such as softwood and hardwood; cotton such as cotton linter and cotton lint; strained lees such as bagasse and sugar beet trash; bast fibers such as flax, ramie, jute, and kenaf; leaf fibers such as sisal and pineapple; petiolar fibers such as abaca and banana; fruit fibers such as coconut palm; base fibers such as bamboo; bacterial cellulose produced by bacteria; and cysts of seaweeds and sea squirts such as valonia and green algae.

These natural celluloses have high crystallinity and are therefore preferable as capable of readily giving fibers having a low coefficient of linear expansion and a high modulus of elasticity. Bacterial cellulose is preferable as capable of readily giving fibers having a small fiber diameter. Cotton is also preferable as capable of readily giving fibers having a small fiber diameter, and another advantage thereof is that its crude material is readily available.

Furthermore, woods such as softwood and hardwood are preferable as capable of giving fibers having a small fiber diameter, and have economic superiorities thereof in that woods are maximum biological resources on earth and are sustainable resources which are said to be produced in an amount of about 70,000,000,000 tons/year or more; and they greatly contribute toward reduction in carbon dioxide, which has an influence on global warming. Such a cellulose-containing substance is subjected to an ordinary purification step and used as the cellulose fiber raw materials of the present invention.

(Method for Purifying Cellulose-Containing Substance)

The cellulose fiber raw materials for use in the present invention are obtained by purifying the cellulose-containing substance derived above in an ordinary method.

Examples of the purification method include a method including degreasing the cellulose-containing substance with a mixed benzene-ethanol solvent or an aqueous sodium carbonate solution, and then subjecting it to a delignification treatment with a chlorite (Wise's method) and to a hemicellulose removal treatment with an alkali.

In addition to the Wise's method, for example, a method using acetic acid (pa method), a method using a mixture of peracetic acid persulfuric acid (pxa method), or the like is also used as the purification method. In addition, if proper, a bleaching treatment or the like may be further carried out.

Alternatively, the purification method may be an ordinary method for preparing chemical pulp, for example, a purification treatment by a method for preparing kraft pulp, sulfite pulp, alkali pulp, or nitric acid pulp, and a method in which cellulose-containing substance is subjected to a treatment for delignification or the like by a heating treatment in a digester, and is further subjected to a bleaching treatment or the like.

(Fiber Diameter of Cellulose Fiber Raw Materials)

The fiber diameter of the cellulose fiber raw materials for use in the present invention is not particularly limited, and the number average fiber diameter is preferably from several micrometers to several millimeters. Cellulose fibers which have undergone general purification have a fiber diameter of several millimeters. For example, in a case of cellulose obtained by purifying raw materials having a size of several centimeters, for example, chips, it is preferable that the cellulose should be subjected to a mechanical treatment with a macerator such as a refiner and a beater, to regulate the fiber diameter thereof to several millimeters.

<Fibrillation Step>

The method for preparing fibrillated cellulose fibers of the present invention includes a fibrillation step, in which cellulose fiber raw materials are subjected to a fibrillation treatment.

The specific method for the fibrillation step is not particularly limited, but examples thereof include a method of putting beads made of ceramics having a diameter of about 1 mm into the cellulose fiber raw material dispersion (which may be hereinafter referred to as a "cellulose fiber dispersion" in some cases) having a cellulose fiber raw material concentration of from 0.1 to 10% by weight, for example, about 1% by weight, and shaking it using a paint shaker, a bead mill, or the like, thereby fibrillating the cellulose.

Further, examples of the dispersion medium for the cellulose fiber dispersion include an organic solvent, water, and a mixed liquid of an organic solvent and water. Examples of the organic solvent include alcohols such as methanol, ethanol, isopropylalcohol, n-propylalcohol, n-butanol, ethylene glycol, and ethylene glycol-mono-t-butyl ether, ketones such as acetone and methyl ethyl ketone, and other water-soluble organic solvents, and these may be used singly or in combination of two or more kinds thereof. The dispersion medium is preferably a mixed liquid of an organic solvent and water, or water, and particularly preferably water.

Examples of the fibrillation method include a method of introducing a cellulose fiber dispersion into a blender-type disperser or through a high-speed rotary slit to impart a shear force thereto for fibrillation (high-speed rotary homogenizer), a method of rapidly reducing the pressure from high pressure to low pressure to generate a shear force between cellulose fibers for fibrillation (high-pressure homogenizer method), and a method of using a counter-collision disperser such as MasscoMizer X (Masuko Sangyo Co., Ltd.). In particular, by employing a treatment with a high-speed rotary homogenizer or a high-pressure homogenizer, the efficiency of fibrillation is improved.

In a case where the cellulose fibers are fibrillated according to the above treatment, the cellulose fiber dispersion having a solid content concentration in terms of the cellulose fiber raw materials that undergo the ordinary purification step described above of preferably 0.1% by weight or more, more preferably 0.2% by weight or more, and particularly preferably 0.3% by weight or more, as well as preferably 10% by weight or less, and more preferably 6% by weight or less is subjected to a fibrillation treatment.

By setting the solid content concentration in the cellulose fiber dispersion provided to the fibrillation step to the lower limit or more, the amount of the liquid is not increased too much, based on the amount of the cellulose treated, and therefore, the efficiency is good. Further, if the solid content concentration is too high, the flowability is poor, and therefore, the concentration of the cellulose fiber dispersion provided to the fibrillation treatment is appropriately adjusted by the addition of water, or the like.

(High-Speed Rotary Homogenizer)

When the fibrillation of the cellulose fiber raw materials is carried out using a high-speed rotary homogenizer, a higher revolution thereof causes shearing to be given thereto, and thus causes the fibrillation efficiency to be increased. The revolution is, for example, preferably 10000 rpm or more, more preferably 15000 rpm or more, and particularly preferably 20000 rpm or more.

Further, the treatment time is preferably 1 minute or more, more preferably 5 minutes or more, and particularly preferably 10 minutes or more.

The treatment is preferably carried out at about 5 to 50° C., more preferably at 10 to 40° C., and particularly preferably at 15 to 30° C. Within the above ranges, reduction in the fibrillation property can be prevented. In a case where heat is generated by shearing, it is preferable that the system be cooled in such a manner that the liquid temperature may not be over 50° C. It is also preferable that the cellulose fiber dispersion is stirred or circulated to apply uniform shearing to the dispersion.

In a case of carrying out a fibrillation treatment by such a high-speed rotary homogenizer, a fibrillation treatment by an ultrasonic treatment as described later may also be carried out in combination therewith. For example, after the fibrillation treatment by the high-speed rotary homogenizer, it is preferable to subject the cellulose fibers to a new microfibrillation treatment by carry outing an ultrasonic treatment as described later.

(High-Pressure Homogenizer)

In a case of fibrillating the cellulose fiber raw materials using a high-pressure homogenizer, the cellulose fiber dispersion is pressurized with a pressure intensifier under a high-pressure condition of preferably 30 MPa or more, more preferably 100 MPa or more, even more preferably 150 MPa or more, and particularly preferably 220 MPa or more, and jetted out through a nozzle having a pore diameter of 50 μm or more to be depressurized such that the pressure difference may be preferably 30 MPa or more, more preferably 80 MPa or more, and even more preferably 90 MPa or more. Due to the cleavage phenomenon caused by the pressure difference, the cellulose fiber raw materials are fibrillated.

Here, by setting the pressure under the high-pressure condition and the pressure difference from the high pressure to the decompression condition to the above ranges, the fibrillation efficiency is improved and it is not necessary to increase the repeating jetting frequency for attaining a desired fiber diameter, which is thus preferable.

With respect to the high pressure condition for jetting, a higher pressure is effective in promoting the microfibrillation by means of an enhanced cleavage phenomenon due to a pressure difference. However, the upper limit in the apparatus specifications is generally 245 MPa or less.

Likewise, although it is preferable that the pressure difference between the high-pressure conditions and the decompression conditions be large, in general, the upper limit of the pressure difference is preferably 245 MPa or less by jetting the cellulose fiber dispersion from the pressurized conditions by a pressure intensifier into atmospheric pressure conditions.

The pore diameter of the pore that jets the cellulose fiber dispersion is preferably from 50 to 800 μm, more preferably from 100 to 500 μm, and even more preferably from 150 to 350 μm.

Further, in a case where the pore diameter of the pore that jets the cellulose fiber dispersion is too large, a sufficient fibrillation effect could not be obtained, and in this case, even when the jetting treatment is repeatedly carried out, cellulose fibers having a desired fiber diameter might not be obtained. If the diameter of the pore that jets the cellulose fiber dispersion is small, the high-pressure state may be easily made, whereas if the diameter of the pore that jets the cellulose fiber dispersion is too small, the jetting efficiency is poor.

If desired, the cellulose fiber dispersion may be jetted out repeatedly plural times to increase the degree of microfibrillation, thereby obtaining fibrillated cellulose fibers having a desired fiber diameter. In general, the repeating frequency (number of passes) is preferably once or more, and more preferably 3 times or more, and is, in general, preferably 20 times or less, and more preferably 15 times or less. When the number of passes is larger, then the degree of microfibrillation may increase, whereas when the number of passes is too large, the cost increases.

The temperature (temperature of the dispersion) for jetting is not particularly limited, but is, in general, preferably from 5° C. to 100° C. If the temperature is too high, the apparatus, specifically, a feed pump, a high-pressure sealant part, or the like may be more likely to be deteriorated.

Further, one or two jetting nozzles may be used and the jetted cellulose fibers may be made to collide against a wall, a ball, or a ring arranged ahead the jetting site. In a case where there are two nozzles, the cellulose fibers may be made to collide with each other at the jetting site.

The high-pressure homogenizer is not particularly limited, but as the specific apparatus, a "Starburst System" manufactured by Gaulin or by Sugino Machine Limited may be used.

Incidentally, only a treatment with such a high-pressure homogenizer may be used, but in this case, the repeating frequency may increase to attain a sufficient degree of microfibrillation, and thus, the treatment efficiency may be poor in some cases. Therefore, it is preferable that, after a high-pressure homogenizer treatment is carried out once to five times, an ultrasonic treatment as described later is carried out for microfibrillation.

(Ultrasonic Treatment)

In a case where a fibrillation treatment by an ultrasonic treatment is carried out after the fibrillation treatment as described above, the cellulose concentration of the cellulose fiber dispersion to be subjected to an ultrasonic treatment is preferably from 0.01 to 10% by weight, more preferably from 0.1 to 5% by weight, and even more preferably from 0.2 to 2% by weight. By setting the cellulose concentration of the cellulose fiber dispersion irradiated with an ultrasonic wave to a lower limit or more, the efficiency is obtained, whereas by setting the cellulose concentration to an upper limit or less, the increase in the viscosity is inhibited, thereby carrying out a uniform fibrillation treatment.

Therefore, in the present invention, in order to adjust the cellulose concentration of the cellulose fiber dispersion that is subjected to an ultrasonic treatment to the above predetermined concentration, it is preferable to add water and/or an organic solvent to adjust the concentration, if desired. If the concentration is more than the upper limit, there is a risk that the effect of the fibrillation by the ultrasonic wave may be reduced.

It is preferable that the cellulose fibers in the cellulose fiber dispersion to which an ultrasonic wave is irradiated be set so as to have a number average fiber diameter of 10 μm or less, and more preferably 2 μm or less, by the fibrillation as described above. Further, it is preferable that the number average fiber diameter of the cellulose fibers be 1 μm or less.

The ultrasonic wave to be irradiated to the cellulose fiber dispersion preferably has a frequency of 15 kHz to 1 MHz, preferably 20 kHz to 500 kHz, and more preferably 20 kHz to 100 kHz. Further, the output of the ultrasonic wave is 1 W/cm$^2$ or more, preferably 10 W/cm$^2$ or more, and more preferably 20 W/cm$^2$ or more, in terms of an effective output density.

A method for irradiating an ultrasonic wave is not particularly limited, and various methods may be used. For example, a method in which a horn that transmits the oscillation of an ultrasonic oscillator is directly inserted into the cellulose fiber dispersion to directly microfibrillate the cellulose fibers, a method in which an ultrasonic oscillator is disposed on a part of the bottom and wall of a container which contains the cellulose fiber dispersion to microfibrillate the cellulose fibers, and a method in which a liquid such as water is placed in a vessel to which an ultrasonic oscillator has been attached, and a vessel containing the cellulose fiber dispersion is immersed therein to indirectly apply ultrasonic oscillation to the cellulose fiber dispersion through the liquid such as water, and microfibrillate the cellulose fibers may be adopted.

(Average Fiber Diameter of Fibrillated Cellulose Fiber Raw Materials)

The fiber diameter of the cellulose fibers (fibrillated cellulose fibers) in the fibrillation or microfibrillated cellulose fiber dispersion by the method may be measured and determined by drying the dispersion to remove the dispersion medium (making a sheet), followed by observing it through SEM, TEM, or the like.

The number average fiber diameter of the fibrillated cellulose fibers is preferably 100 nm or less, more preferably 80 nm or less, and particularly 50 nm or less, from a viewpoint of obtaining a highly transparent cellulose fiber composite.

Moreover, a lower number average fiber diameter is more preferred, but it is important that the number average fiber diameter should maintain the crystallinity of the cellulose from a viewpoint of exhibiting a low coefficient of linear expansion and a high modulus of elasticity. Further, the number average fiber diameter is substantially preferably 4 nm or more, which is a fiber diameter of a cellulose crystal unit.

<Reduction Treatment Step>

In the method for preparing fibrillated cellulose fibers of the present invention, a reduction treatment of the cellulose is carried out in any step of obtaining fibrillated cellulose fibers.

By this reduction treatment, coloration of the fibrillated cellulose fibers, the cellulose fiber assembly, or the cellulose fiber composite, and coloration by heating may be inhibited.

The cellulose may be yellowish by using raw materials derived from woods, in particular. Although this may be a case where the cellulose itself is colored or a case where materials other than the cellulose left depending on the degree of purification is colored, according to the present invention, coloration of the cellulose fibers, the cellulose fiber assembly, or the cellulose fiber composite, and coloration by heating may be decreased by carrying out the reduction treatment of the cellulose.

A chemical reaction mechanism on the inhibition of the coloration of cellulosic fibers by the reduction treatment is not been completely clarified, but it is presumed as follows.

That is, causes of coloration of a quinone structure or an aldehyde structure included in the cellulose have been known, but it is thought that by subjecting the cellulose to a reduction treatment, the quinone structure of the cellulose is reduced to a hydroquinone structure, an further, the aldehyde structure is reduced to an alcohol structure, thereby reducing the colored structure. Therefore, the chemical species capable of reducing the quinone structure or the aldehyde structure may be used as a reducing agent for use in the present invention.

In the method for preparing fibrillated cellulose fibers of the present invention, the reduction treatment of cellulose may be carried out in any step, and may be carried after the fibrillation treatment of the cellulose fiber raw materials or before the fibrillation treatment.

In a case where the reduction treatment is carried out after the fibrillation treatment of the cellulose fiber raw materials, the fibrillated cellulose fibers may be subjected to a reduction treatment or may be subjected to a reduction treatment after it is made into a cellulose fiber assembly as described later.

In addition, in a case where the reduction treatment is carried out before the fibrillation treatment, a cellulose-containing material may be introduced into a purification step. However, in a case of including a step of oxidizing the cellulose, the reduction treatment is preferably carried out after the step above.

For example, in a case where the delignification step in the purification of the cellulose-containing substance is carried out under oxidization conditions, for example, by a Wise's method or a pa method, the reduction treatment is preferably carried out thereafter, and a reducing agent may be added in a hemicellulose removal step carried out after the delignification step to carry out the hemicellulose removal and the reduction treatment at the same time.

A specific method for the reduction treatment is not particularly limited, but examples thereof include a method in which cellulose fibers (cellulose fiber raw materials before fibrillation, fibrillated cellulose fibers, a cellulose fiber assembly, and the like, which may be totally referred to as "cellulose fibers" in some cases) are suspended or immersed in a solution including a reducing agent. At this time, it is preferable to control the conditions for processing the reduction reaction efficiently, for example, by stirring or warming a treatment liquid that is a solution including a reducing agent or adjusting the pH of the treatment liquid.

The reducing agents may be used singly or in combination of two or more kinds thereof. Further, a reducing agent or chemical species having a reductive action may be generated in the treatment liquid and used. The form of the cellulose fibers to be suspended or immersed in the treatment liquid may be any one of cellulose fiber raw materials, fibrillated cellulose fibers, a cellulose fiber assembly, and the like, and in a case where the cellulose fibers are formed into a dispersion, a reducing agent may be added to the dispersion.

(Reducing Agent)

The reducing agent is not particularly limited, but examples thereof include metal hydride, dithionite (=hydrosulfite), sulfite, bisulfite, thiourea dioxide (=formamidine-sulfinic acid, FAS), and hydrazine.

Examples of the metal hydride include sodium borohydride, sodium cyanoborohydride, lithium triethylborohydride, lithium tri(sec-butyl)borohydride, potassium tri(sec-butyl)borohydride, lithium borohydride, zinc borohydride, sodium acetoxyborohydride, lithium aluminum hydride, sodium bis(2-methoxyethoxy)aluminum hydride, diborane, and diisobutylaluminum hydride.

Examples of the dithionite include sodium dithionite and potassium dithionite. Dithionite is highly unstable, and sodium dithionite is oxidized to sodium bisulfite or sodium bisulfate in the air. Sodium dithionite is soluble in water, but is more unstable in an aqueous solution. As a result, it is preferable that sodium dithionite be generated in a treatment liquid system.

Examples of the method for preparing sodium dithionite include a sodium formate method (a method in which an aqueous sodium hydroxide solution and an anhydrous sulfite solution are added to an aqueous solution of sodium formate in an alcohol) and a Borol method (a preparation method in which sodium bisulfite is added to sodium borohydride).

Thiourea dioxide itself is a compound that shows neither an oxidizing ability nor a reducing ability, but sulfinic acid produced through the decomposition by heat and moisture shows a strong reducing action. Sodium sulfinate is generated in an aqueous alkali solution, and thus, the same reduction action as sulfinic acid is obtained.

For sodium borohydride, sodium dithionite, or thiourea dioxide, water or an alcohol that is alkaline (for example, pH 7.5 to 14) may be used as a solvent, and thus, it is particularly preferred since cellulose fibers are easily suspended or immersed therein. Among those, sodium borohydride is particularly preferred.

(Solvent)

The solvent used in the reduction treatment is not particularly limited, but water, alcohols, or organic solvents may be used singly or in combination of two or more kinds thereof. A water-soluble solvent is preferable since the cellulose fibers in the hydrous state are easily suspended and immersed therein, and in particular, water, an alcohol, or a mixture of water and an alcohol is particularly preferred since cellulose fibers are easily suspended and immersed therein.

As the alcohol, one kind or two or more kinds of the alcohols or the like exemplified as the dispersion of the cellulose fiber dispersion as describe above may be used.

(Treatment Condition)

The amount of the reducing agent to be used in the reduction treatment varies depending on the kind of the reducing agent used, but the amount of the reducing agent is usually from 0.1 to 30% by weight, preferably from 1 to 20% by weight, and more preferably 3 to 10% by weight, based on the dry weight of the cellulose fibers. By setting the amount of the reducing agent to 0.1% by weight or more, the effect of the reduction treatment may be attained, whereas by setting the amount of the reducing agent to 30% by weight or less, the coloration of the cellulose fibers may be prevented.

In general, the amount of the solvent is preferably from 0.5 parts by weight to 10000 parts by weight, more preferably from 1 part by weight to 1000 parts by weight, and even more preferably 10 parts by weight to 100 parts by weight, based on 1 part by weight of the dry weight of the cellulose fibers.

In general, the temperature of the treatment liquid is preferably 10° C. or higher, more preferably 50° C. or higher, and even more preferably 80° C. or higher, as well as in general, preferably 130° C. or less. The reduction treatment time is preferably from 10 minutes to 10 hours, and more preferably from about 30 minutes to 3 hours.

The treatment temperature and the treatment time may be appropriately determined in accordance with the kind or amount of the reducing agent used, or the like, but in order to carry out the reduction efficiently, the temperature is preferably high. Further, in order to prevent the coloration at an initial time or improve the fibrillation while not causing thermal decomposition of cellulose or hemicellulose constituting the cellulose fibers, the temperature is preferably not too high. In addition, the treatment time is also preferably within the above ranges so as to ensure the reduction treatment to be carried out for not too a long period of time.

In addition, it is possible to determine whether the reduction treatment is sufficiently carried out or not, for example, by the presence or absence of the coloration after heating the cellulose fiber composite prepared using the cellulose fibers that have been subjected to a reduction treatment, and the reduction treatment may be carried out to an extent that a cellulose fiber composite having a low coloration after heating may be prepared.

<Chemical Modification Treatment>

In the present invention, the cellulose fiber raw materials or the cellulose fiber raw materials after fibrillation (fibrillated cellulose fibers) may be subjected to a chemical modification treatment. Further, the cellulose fiber assembly as described above may be subjected to this chemical modification treatment. The chemical modification means that a hydroxyl group in cellulose is chemically modified through a reaction with a chemical modifier.

(Kinds)

Examples of the functional group to be introduced into cellulose through the chemical modification include acyl groups such as an acetyl group, an acryloyl group, a methacryloyl group, a propionyl group, a propioyl group, a butyryl group, a 2-butyryl group, a pentanoyl group, a hexanoyl group, a heptanoyl group, an octanoyl group, a nonanoyl group, a decanoyl group, an undecanoyl group, a dodecanoyl group, a myristoyl group, a palmitoyl group, a stearoyl group, a pivaloyl group, a benzoyl group, a naphthoyl group, a nicotinoyl group, an isonicotinoyl group, a furoyl group, and a cinnamoyl group; isocyanate groups such as a 2-methacyloyloxyethylisocyanoyl group; alkyl groups such as a methyl group, an ethyl group, a propyl group, a 2-propyl group, a butyl group, a 2-butyl group, a tert-butyl group, a pentyl group, a hexyl group, a heptyl group, an octyl group, a nonyl group, a decyl group, an undecyl group, a dodecyl group, a myristyl group, a palmityl group, and a stearyl group; as well as an oxirane group, an oxetane group, a thiirane group, and a thietane group. Among those, acyl group having 2 to 12 carbon atoms such as an acetyl group, an acryloyl group, a methacryloyl group, a benzoyl group, and a naphthoyl group; and alkyl group having 1 to 12 carbon atoms such as a methyl group, an ethyl group, and a propyl group are particularly preferred.

(Modification Method)

The modification method is not particularly limited, but examples thereof include a method of reacting cellulose fibers with a chemical modifier as mentioned below. The reaction condition is not particularly limited, but a solvent, a catalyst, or the like may be used or heating, pressure reduction, or the like may be carried out, as desired.

Examples of the chemical modifier include one kind or two or more kinds selected from an acid, an acid anhydride, an alcohol, a halogenation reagent, and cyclic ethers such as isocyanate, alkoxysilane, and oxirane (epoxy).

Examples of the acid include acetic acid, acrylic acid, methacrylic acid, propanoic acid, butanoic acid, 2-butanoic acid, and pentanoic acid.

Examples of the acid anhydride include acetic anhydride, acrylic anhydride, methacrylic anhydride, propanoic anhydride, butanoic anhydride, 2-butanoic anhydride, and pentanoic anhydride.

Examples of the halogenation reagent include, for example, acetyl halides, acryloyl halides, methacryloyl halides, propanoyl halides, butanoyl halides, 2-butanoyl halides, pentanoyl halides, benzoyl halides, and naphthoyl halides.

Examples of the alcohol include methanol, ethanol, propanol, and 2-propanol.

Examples of the isocyanate include methyl isocyanate, ethyl isocyanate, and propyl isocyanate.

Examples of the alkoxysilane include methoxysilane and ethoxysilane.

Examples of the cyclic ethers such as oxirane (epoxy) include ethyloxirane and ethyloxethane.

Among these, acetic anhydride, acrylic anhydride, methacrylic anhydride, benzoyl halide, or naphthoyl halide is particularly preferred.

These chemical modifiers may be used singly or in combination of two or more kinds thereof.

(Chemical Modification Rate)

The chemical modification rate as mentioned herein denotes a ratio of chemically modified groups to all the hydroxyl groups in cellulose, and the chemical modification rate may be determined according to the following titration method.

0.05 g of dried cellulose is accurately weighed, and 1.5 ml of ethanol and 0.5 ml of distilled water are added thereto. The mixture is stirred in a bath at 60 to 70° C. for 30 minutes, and then 2 ml of a 0.5 N aqueous sodium hydroxide solution is added thereto. The mixture is left to stand in the bath at 60 to 70° C. for 3 hours, and then shaken with an ultrasonic wave with an ultrasonic wave washing machine for 30 minutes. Using phenolphthalein as an indicator, the mixture is titrated with an aqueous 0.2 standard hydrochloric acid solution.

Here, from the amount Z (ml) of the 0.2 N aqueous hydrochloric acid solution that is needed for titration, the molar number Q of the substituent introduced through the chemical modification is determined according to the following formula.

$$Q(mol)=0.5(N)\times 2(ml)/1000-0.2(N)\times Z(ml)/1000$$

The relationship between the molar number Q of the substituent and the chemical modification rate X (mol %) is calculated according to the following formula (cellulose= $(C_6O_5H_{10})_n$=$(162.14)_n$, number of hydroxyl groups per repeating unit=3, molecular weight of OH=17). Further, in the following, T is the molecular weight of the substituent.

$$\frac{\text{Amount of sample}}{162.14+(T-17)\times\frac{3X}{100}}=\frac{Q}{\frac{3X}{100}} \quad [\text{Math. 1}]$$

This equation is solved as shown below.

$$X=\frac{100}{3}\times\frac{162.14\times Q}{\left\{\frac{\text{Amount of}}{\text{sample}}-Q\times(T-17)\right\}} \quad [\text{Math. 2}]$$

In the present invention, the chemical modification rate of the cellulose is not particularly limited, but is generally preferably 65 mol % or less, more preferably 50 mol % or less, and even more preferably 40 mol % or less, based on all the hydroxyl groups in cellulose. A particular lower limit of the chemical modification rate is not present.

When the chemical modification is carried out, the decomposition temperature of the cellulose increases and the heat resistance increases, and if the chemical modification rate is too high, the cellulose structure is destroyed and the crystallinity decrease, which causes a problem that the coefficient of linear expansion of the obtained cellulose fiber composite increases, which is thus not preferable.

2. Method for Preparing Cellulose Fiber Assembly

Next, the method for preparing a cellulose fiber assembly of the present invention will be described. The method for preparing a cellulose fiber assembly of the present invention may include a fibrillation step of fibrillating cellulose fiber raw materials to obtain fibrillated cellulose fibers, and an assembly preparation step of obtaining a cellulose fiber assembly using the fibrillated cellulose fibers, which includes carrying out a reduction treatment.

The step of carrying out a reduction treatment in the method for preparing a cellulose fiber assembly of the present invention is the same as the step of a reduction treatment described in the method for preparing fibrillated cellulose fibers of the present invention above.

In the method for preparing a cellulose fiber assembly of the present invention, the reduction treatment step may be in any step in the preparation of a cellulose fiber assembly, and as described above, either of the cellulose fiber raw materials and the fibrillated cellulose fibers may be subjected to the reduction treatment step. Further, the cellulose fiber assembly as described later may also be subjected to the reduction treatment.

In the method for preparing a cellulose fiber assembly of the present invention, the fibrillation step of fibrillating cellulose fiber raw materials to obtain fibrillated cellulose fibers is also the same as the fibrillation step described in the method for preparing fibrillated cellulose fibers of the present invention above.

Furthermore, the chemical modification treatment of cellulose may be carried out in any step of the method for preparing a cellulose fiber assembly of the present invention, as in the method for preparing fibrillated cellulose fibers of the present invention.

<Assembly Preparation Step>

In the assembly preparation step, a cellulose fiber assembly is prepared using the fibrillated cellulose fibers obtained through the fibrillation step. Here, in the present invention, the cellulose fiber assembly usually refers to an assembly of cellulose fibers, obtained by filtering fibrillated cellulose fibers in the form of a dispersion or removing the dispersion medium from the dispersion applied on a suitable substrate by a method such as volatilization, and examples of the assembly include a sheet, a particle, and a gel.

(Sheet)

Using the fibrillated cellulose fibers, a cellulose fiber sheet may be formed. Specifically, the fibrillated cellulose fibers in the form of a dispersion, which has been subjected to the fibrillation step above, may be filtered or applied on a suitable substrate to form a cellulose fiber sheet. In this manner, a sheet having a high transparency, a low coefficient of linear expansion, and a high modulus of elasticity is obtained by the preparation using the cellulose fibers microfibrillated by the fibrillation step.

By forming a cellulose fiber sheet and impregnating a resin thereinto, a cellulose fiber composite may be formed. Further, a cellulose fiber sheet may be interposed into the resin sheets to form a cellulose fiber composite.

In a case where the cellulose fiber sheet is prepared by filtering fibrillated cellulose fibers in the form of a dispersion, the cellulose fiber concentration of the dispersion provided for filtration is preferably 0.01% by weight or more, more preferably 0.05% by weight or more, and even more preferably 0.1% by weight or more. By setting the cellulose fiber concentration within the above ranges, it does not take much time for filtration, which is thus preferable.

Furthermore, the cellulose fiber concentration of the dispersion is preferably 1.5% by weight or less, more preferably 1.2% by weight or less, and even more preferably 1.0% by weight or less. By setting the cellulose fiber concentration within the above ranges, uniform sheets may be obtained.

In a case of filtering the dispersion, it is important that the microfibrillated cellulose fibers should not pass through the filter fabric and the filtration speed should not be too slow. As such a filter fabric, a sheet, fabric, or porous film, made of an organic polymer, is preferred.

The organic polymer is preferably a non-cellulose-based organic polymer such as polyethylene terephthalate, polyethylene, polypropylene, and polytetrafluoroethylene (PTFE).

The pore diameter is preferably from 0.1 to 20 µm, and specific examples of the filter fabric include a porous film of polytetrafluoroethylene having a pore diameter of 0.5 to 1 µm, and a fabric of polyethylene terephthalate or polyethylene having a pore diameter of 0.5 to 1 µm.

After filtering the fibrillated cellulose fibers in the form of a dispersion, the product may be dried. Drying is not necessarily carried out in any case, but it is preferable to carry out drying in view of controlling the porosity and the film thickness, and reinforcing the sheet structure.

The drying may be carried out with air blowing or under reduced pressure, or may be dried with pressurization. Further, heating may be carried out with the drying. In a case of heating, the temperature is preferably 50° C. or higher, more preferably 80° C. or higher, even more preferably 250° C. or lower, and even still more preferably 150° C. or lower.

By setting the heating temperature to the lower limit or higher, drying may be sufficiently carried out while not requiring much time. Further, by setting the heating temperature to the upper limit or lower, the cellulose fiber sheet may be prevented from being colored and the cellulose may be prevented from being decomposed.

Furthermore, in a case of pressurizing, the pressure is preferably 0.01 MPa or more, more preferably 0.1 MPa or more, as well as preferably 5 MPa or less, and more preferably 1 MPa or less. By setting the pressure to the lower limit or more, sufficient drying may be attained. Further, by setting the pressure to the upper limit or less, the cellulose fiber sheet may be prevented from being distorted or the cellulose may be prevented from be decomposed.

The cellulose fiber sheet may be various porosities by a method for preparing the same. In generally, the porosity of the cellulose fiber sheet is preferably 10% by volume or more, and more preferably 20% by volume or more, as well as preferably 80% by volume or less.

By setting the porosity of the cellulose fiber sheet to the lower limit or more, in a case of impregnating a resin in the cellulose fiber sheet to obtain a cellulose fiber composite, the resin is easily impregnated in a cellulose fiber sheet, which is thus preferable.

Furthermore, by setting the porosity of the cellulose fiber sheet to the upper limit or less, when being formed into a cellulose fiber composite, a sufficient reinforcing effect by the cellulose fibers is obtained, thereby obtaining a sufficient rate of linear expansion or modulus of elasticity.

As mentioned herein, the porosity of the cellulose fiber sheet is simply and easily by the following equation.

$$\text{Porosity}(\% \text{ by volume}) = \{1 - B/(M \times A \times t)\} \times 100$$

Here, $A$ is an area (cm$^2$) of the cellulose fiber sheet, $t$ is the thickness (cm), $B$ is the weight (g) of the sheet, and $M$ is the density of cellulose, and in the present invention, it is assumed that $M = 1.5$ g/cm$^3$.

For the film thickness of the cellulose fiber sheet, the measurements are carried out at ten points at various positions of the sheet using a thickness meter (PDN-20, manufactured by PEACOK), and an average value thereof is adopted. In the section of Examples described later, the film thickness was determined by this measurement method.

Examples of the method for obtaining a cellulose fiber sheet having a large porosity include a method in which in the step of forming a film by filtration, water in the cellulose fiber sheet is finally substituted with an organic solvent such as an alcohol.

That is, water is removed by filtration and when the cellulose content reaches 5 to 99% by weight, an organic solvent such as an alcohol is added. Otherwise, after introducing a dispersion of fibrillated cellulose fibers into the filtration apparatus, an organic solvent such as an alcohol is gently introduced to the upper portion of the dispersion, whereby it is also possible to substitute water in the cellulose fiber sheet with an organic solvent such as an alcohol at the final stage of the filtration.

The organic solvent such as an alcohol to be used here is not particularly limited, but examples thereof include one kind or two or more kinds of organic solvents selected from alcohols such as methanol, ethanol, 1-propanol, 2-propanol, 1-butanol, ethylene glycol, and ethylene glycol-mono-t-butyl ether, acetone, methylethylketone, tetrahydrofuran, cyclohexane, toluene, and carbon tetrachloride. In a case of using a non-water soluble organic solvent, it is preferable to use a mixed solvent formed by mixing the non-water soluble organic solvent with a water-soluble organic solvent, or to substitute water with a water-soluble organic solvent, and substitute it with the non-water soluble organic solvent.

By controlling the porosity as above, it is also possible to control the film thickness of the cellulose fiber sheet.

Furthermore, examples of the method of controlling the porosity include a method in which a solvent having a higher boiling point than the alcohol or the like is mixed with a dispersion of fibrillated cellulose fibers, and dried at a lower temperature of the boiling point of the solvent. In this case, if desired, the solvent having a high boiling point that remains after drying is substituted with another solvent, and then impregnated in a resin to form a cellulose fiber composite.

The cellulose fiber sheet formed by removing the solvent by filtration is then dried as described above, but it may be subjected to the next step without drying, if desired. However, in views of controlling the porosity and the film thickness and reinforcing the structure of the sheet, it is preferable to carry out the drying as described above.

The thickness of the cellulose fiber sheet is not particularly limited, but is preferably 1 μm or more, and more preferably 5 μm or more. Further, in general, it is preferably 1000 μm or less, and more preferably 250 μm or less.

(Particles)

The fibrillated cellulose fibers may be used to form cellulose fiber particles. The cellulose fiber particles are suitably used, in particular, in forming a composite by kneading with a thermoplastic resin, and they are useful for various structure materials, in particular, automobile panels excellent in the surface ornamental design or external wall panels for buildings by taking advantage of its characteristics such as a high modulus of elasticity, a low rate of linear expansion, or surface smoothness.

Examples of the method for forming particles of the fibrillated cellulose fibers include a method in which fibrillated cellulose fibers in the form of a dispersion are sprayed from spray nozzles or the like to remove the dispersion medium for granulation by means of, for example, a known spray drying apparatus.

Specific examples of such a spraying method include a method by means of a rotary disk, a method by means of a pressure nozzle, and a method by means of a twin-fluid nozzle. The particles obtained by spray drying may further be dried by using another drying apparatus. In such a case, examples of the heat energy source include infrared rays and microwaves.

Furthermore, the fibrillated cellulose fibers may be freeze-dried, followed by pulverization, to obtain cellulose fiber particles. In this case, specifically, a method in which the fibrillated cellulose fibers are cooled with liquid nitrogen or the like, followed by pulverization with a grinder, a rotary knife, or the like.

The particle diameter of the cellulose fiber particles is not particularly limited, but in general, it is preferably from 1 μm to 1 mm. Such a particle diameter is more preferably from 5 μm to 100 μm, and particularly preferably from 5 μm to 50 μm. By setting the particle diameter of the cellulose fiber particles to the upper limit or less, it may be prevented to cause poor dispersion when forming into a composite with a resin. Further, by setting the particle diameter to the lower limit or more, it may be prevented that it becomes difficult to handle with being fluffy.

(Gel)

By forming a composite from the fibrillated cellulose fibers with polymers other than cellulose, a cellulose fiber composite may be obtained. Composite formation with the fibrillated cellulose fibers and polymers other than cellulose may be carried out in the dispersion medium while not removing the dispersion medium from the fibrillated cellulose fibers, and a composite may also be obtained by carrying out composite formation, and then removing the dispersion medium.

The dispersion medium for the fibrillated cellulose fibers is an organic solvent other than water, and it is more preferable to carry out composite formation after substituting water with another organic solvent or substituting the organic solvent with water or with a dispersion medium which is suitable for carrying out composite formation with polymers other than cellulose, and then carrying out composite formation.

In the process of the removal or substitution of the dispersion medium while forming a composite from the fibrillated cellulose fibers, the fibrillated cellulose fibers may be in the state of a cellulose fiber gel in some cases.

The cellulose fiber gel is formed when the cellulose fibers form a three-dimensional mesh-shaped structure, which is then wet or swollen by a dispersion medium, and the mesh structure is formed by chemical crosslinking or physical crosslinking. By incorporating a predetermined amount of a dispersion medium in the gel, a three-dimensional mesh-shaped structure of the cellulose fibers in the gel is maintained.

The content of the dispersion medium in the gel is preferably 10% by weight or more, more preferably 50% by weight or more, and even more preferably 70% by weight or more. Within the above ranges, sufficient optical isotropy and surface smoothness of the obtained cellulose fiber composite are obtained.

In addition, the upper limit is preferably 99% by weight or less, more preferably 97% by weight or less, and even more preferably 95% by weight or less. Within the above ranges, the handling property of the gel may be enhanced, and thus the productivity may be improved.

Moreover, in general, the content of the cellulose fibers in the gel is preferably 90% by weight or less, more preferably 50% by weight or less, and even more preferably 30% by weight or less. Within the above ranges, sufficient optical isotropy and surface smoothness of the obtained cellulose fiber composite are obtained.

In addition, the lower limit is preferably 1% by weight or more, more preferably 3% by weight or more, and even more preferably 5% by weight or more. Within the above ranges, the handling property of the gel may be enhanced, and thus the productivity may be improved.

The weight ratio of the dispersion medium to the cellulose fibers (cellulose fibers/dispersion medium) in the gel is preferably from 9/1 to 1/99, more preferably from 1/1 to 3/97, and even more preferably from 3/7 to 5/95. By setting the weight ratio to 9/1 or less, sufficient optical isotropy and surface smoothness of the obtained cellulose fiber composite are obtained. By setting the weight ratio to 1/99 or more, the shape of the gel may be maintained, and thus, may be easily handled.

The dispersion medium contained in the cellulose fiber gel is usually a dispersion medium for fibrillated cellulose fibers, and in general, water, but it may be a mixed dispersion medium formed of one kind or two or more kinds of the organic solvents. Further, it may also be a mixed dispersion medium formed of water and an organic solvent.

The dispersion medium contained in the cellulose fiber gel may be substituted with another kind of a dispersion medium, if desired, as long as the content of the dispersion medium is within the above ranges. That is, after the gel preparation step, a dispersion medium-substituting step in which the dispersion medium (first dispersion medium) in the cellulose fiber gel is substituted with another dispersion medium (second dispersion medium) may also be carried out, if desired.

As for the substituting method, a gel containing an organic solvent such as an alcohol may be prepared, for example, after removing a predetermined amount of the dispersion medium contained in the dispersion by the filtration method and then adding an organic solvent such as an alcohol thereto. More specifically, for example, a case where the first dispersion medium is water and the second dispersion medium is an organic solvent may be mentioned.

Furthermore, the kind of the second dispersion medium is not particularly limited, and examples thereof include one kind or two or more kinds of organic solvents selected from alcohols such as methanol, ethanol, 1-propanol, 2-propanol, and 1-butanol, acetone, methylethylketone, tetrahydrofuran, cyclohexane, toluene, and carbon tetrachloride.

The shape of the cellulose fiber gel is not particularly limited, and may be appropriately controlled to a sheet or film shape (for example, having a thickness of from 10 μm to 10 cm), a particle shape, or the like.

3. Cellulose Fiber Composite

By carrying out composite formation from a cellulose fiber assembly such as a cellulose fiber sheet, a cellulose fiber particle, and a cellulose fiber gel with matrix materials, the cellulose fiber composite of the present invention is obtained. Further, the cellulose fiber composite may be directly prepared from fibrillated cellulose fibers, while not preparing a cellulose fiber assembly in the course.

The cellulose fiber composite of the present invention is useful for substrate materials for various displays, substrates for solar cells, window materials, or the like, by taking advantage of its characteristics such as a high transparency, a low rate of linear expansion, and low coloration, and is also useful for various structural materials, particularly for automobile panels excellent in the surface ornamental design, external wall panels for buildings, or the like, by taking advantage of its characteristics such as a high modulus of elasticity, a low rate of linear expansion, and surface smoothness.

The method for preparing a cellulose fiber composite by carrying out composite formation from the cellulose fiber assembly or the fibrillated cellulose fibers will be described below.

The cellulose fiber composite is a composite formed by carrying out composite formation from the cellulose fiber assembly such as a cellulose fiber sheet, cellulose fiber particles, and a cellulose fiber gel, obtained by the method for preparing the cellulose fiber assembly of the present invention or fibrillated cellulose fibers with polymers (matrix materials) other than cellulose.

Here, the matrix materials refer to polymer materials that are bonded to a cellulose fiber sheet, fill the void, or knead granulated cellulose fiber particles, or precursors (for example, monomers) thereof.

Suitable as the matrix material is at least one type of resin (polymer material) obtained from a thermoplastic resin that becomes a flowable liquid when heated, a thermosetting resin that undergoes polymerization when heated, an active energy ray curable resin that is polymerized and cured when irradiated with active energy rays such as ultraviolet rays and electron rays, and the like, or a precursor thereof.

Moreover, the precursor of the polymer material in the present invention is a so-called monomer or oligomer, and examples thereof include monomers that will be described later as polymerizable or copolymerizable components in the section of Thermoplastic Resin (which may be hereinafter referred to as thermoplastic resin precursors in some cases) and the precursors that will be described later in the sections of Thermosetting Resin and Photocurable Resin.

Examples of methods for carrying out composite formation from the cellulose fiber sheet, the cellulose fiber particles, the cellulose fiber gel, or the fibrillated cellulose fibers with matrix materials include the following methods (a) to (j). Further, the polymerizing and curing step of the curable resin will be described in detail in the section of <Polymerization Curing Step>.

(a) A method of impregnating a liquid thermoplastic resin precursor into a cellulose fiber sheet, cellulose fiber particles, or a cellulose fiber gel, followed by polymerization.

(b) A method of impregnating a thermosetting resin precursor or a photocurable resin precursor into a cellulose fiber sheet, cellulose fiber particles, or a cellulose fiber gel, followed by polymerizing and curing.

(c) A method of impregnating a resin solution (solution containing at least one solute selected from a thermoplastic resin, a thermoplastic resin precursor, a thermosetting resin precursor, and a photocurable resin precursor) into a cellulose fiber sheet, cellulose fiber particles, or a cellulose fiber gel, followed by drying, and then bonding by a hot press or the like, and if desired, polymerizing and curing.

(d) A method of impregnating a melt of a thermoplastic resin into a cellulose fiber sheet, cellulose fiber particles, or a cellulose fiber gel, followed by bonding by a hot press or the like.

(e) A method of alternately laminating a thermoplastic resin sheet and a cellulose fiber sheet or cellulose fiber gel, followed by bonding by a hot press or the like.

(f) A method of applying a liquid thermoplastic resin precursor or thermosetting resin precursor, or a photocurable resin precursor on one side or both sides of a cellulose fiber sheet or cellulose fiber gel, followed by polymerizing and curing.

(g) A method of applying a resin solution (solution containing at least one solute selected from a thermoplastic resin, a thermoplastic resin precursor, a thermosetting resin precursor, and a photocurable resin precursor) on one side or both sides of a cellulose fiber sheet or cellulose fiber gel, followed by removing the solvent, and if desired, polymerizing and curing.

(h) A method of melt-kneading cellulose fiber particles and a thermoplastic resin, followed by molding into a sheet shape or a desired shape.

(i) A method of mixing fibrillated cellulose fibers and a monomer solution or dispersion (solution or dispersion containing at least one solute or dispersion medium selected from a thermoplastic resin precursor, a thermosetting resin precursor, and a photocurable resin precursor), followed by removing the solvent, and polymerizing and curing.

(j) A method of mixing fibrillated cellulose fibers with a polymer solution or dispersion (thermoplastic resin solution or dispersion), and then removing the solvent.

Among them, to the cellulose fiber sheet, the method (a), (b), (c), (d), (e), (f), or (g) is preferred, and for the cellulose fiber particles, the method (h) is preferred.

Examples of the method (a) of impregnating a liquid thermoplastic resin precursor into a cellulose fiber sheet, cellulose fiber particles, or a cellulose fiber gel, followed by polymerization include a method of impregnating a polymerizable monomer or oligomer to a cellulose fiber sheet, cellulose fiber particles, or a cellulose fiber gel, and polymerizing the monomer by a heat treatment or the like to obtain a cellulose fiber composite. Generally, a polymerization catalyst to be used for the polymerization of monomers may be used as a polymerization initiator.

Examples of the method (b) of impregnating a thermosetting resin precursor or a photocurable resin precursor into a cellulose fiber sheet, cellulose fiber particles, or a cellulose fiber gel, followed by polymerizing and curing, include a method of impregnating a thermosetting resin precursor such as an epoxy resin monomer, or a mixture of a photocurable resin precursor such as an acryl resin monomer and a curing agent, to a cellulose fiber sheet, cellulose fiber particles, or a cellulose fiber gel, and curing the thermosetting resin precursor or photocurable resin precursor by heat, active energy rays, or the like to obtain a cellulose fiber composite.

Examples of the method (c) of impregnating a resin solution (solution containing at least one solute selected from a thermoplastic resin, a thermoplastic resin precursor, a thermosetting resin precursor, and a photocurable resin precursor) into a cellulose fiber sheet, cellulose fiber particles, or a cellulose fiber gel, followed by drying, and then bonding by a hot press or the like, and if desired, polymerizing and curing, include a method of dissolving a resin in a solvent in which a resin is dissolved, impregnating the solution to a cellulose fiber sheet, cellulose fiber particles, or a cellulose fiber gel, followed by drying, to obtain a cellulose fiber composite.

In this case, a method of boding the void formed by drying the solvent by a hot press or the like after drying to obtain a cellulose fiber composite having high performance may be mentioned. In a case of a photocurable resin, if desired, polymerizing and curing is carried out by active energy rays or the like.

Here, the solvent for dissolving the resin may be selected taking the solubility of the resin, or in a case of using a cellulose fiber gel, the affinity thereof into consideration, and specifically, selected from those exemplified as a dispersion medium for the cellulose fiber gel according to the solubility of the resin.

Examples of the method (d) of impregnating a melt of a thermoplastic resin into a cellulose fiber sheet, cellulose fiber particles, or a cellulose fiber gel, followed by bonding by a hot press or the like, include a method in which the thermoplastic resin is melted by a heat treatment at a temperature of the glass transition temperature or higher or the melting point or higher, and impregnated to a cellulose fiber sheet, cellulose fiber particles, or a cellulose fiber gel, followed by bonding by a hot press or the like, to obtain a cellulose fiber composite. The heat treatment is preferably carried out under pressure, and it is effective to use an installation having a vacuum hot press function.

Examples of the method (e) of alternately laminating a thermoplastic resin sheet and a cellulose fiber sheet or cellulose fiber gel, followed by bonding by a hot press or the like, include a method in which a thermoplastic resin film or sheet is disposed on one side or both sides of the cellulose fiber sheet or cellulose fiber gel, followed by heating or pressing, if desired, to bond the thermoplastic resin to the cellulose fiber sheet or cellulose fiber gel.

In this case, an adhesive, a primer, or the like may be applied to the surface of the cellulose fiber sheet, followed by bonding. In order not to include air bubbles at the time of bonding, it is possible to employ a method of passing through a pair of rolls under pressure or a method of pressing under a vacuum condition.

Examples of the method (f) of applying a liquid thermoplastic resin precursor or thermosetting resin precursor, or a photocurable resin precursor on one side or both sides of a cellulose fiber sheet or cellulose fiber gel, followed by curing, include a method in which a thermosetting resin precursor using a thermal polymerization initiator is applied on one side or both sides of a cellulose fiber sheet or cellulose fiber gel, followed by heating for curing to bond them, or a method in which a photocurable resin precursor using a photopolymerization initiator is applied on one side or both sides of a cellulose fiber sheet or cellulose fiber gel, followed by irradiation with active energy rays such as ultraviolet rays for curing.

After applying a thermosetting or photocurable resin precursor on a cellulose fiber sheet, the cellulose fiber sheet may further be overlaid, for example, to form a laminated structure, which may then be cured.

Examples of the method (g) of applying a resin solution (solution containing at least one solute selected from a thermoplastic resin, a thermoplastic resin precursor, a thermosetting resin precursor, and a photocurable resin precursor) on one side or both sides of a cellulose fiber sheet or cellulose fiber gel, followed by removing the solvent, and if desired, polymerizing and curing to form a composite, include a method in which a resin solution having a solvent-soluble resin dissolved therein is prepared and applied on one side or both sides of a cellulose fiber sheet or cellulose fiber gel, followed by removing the solvent by heating. In a case of the photocurable resin, if desired, polymerizing and curing by active energy rays or the like is carried out.

The solvent for dissolving the resin may be selected taking the solubility of the resin, or in a case of using a cellulose fiber gel, the affinity thereof into consideration, and specifically, selected from those exemplified as a dispersion medium for the cellulose fiber gel according to the solubility of the resin.

Examples of the method (h) of melt kneading cellulose fiber particles and a thermoplastic resin, followed by molding into a sheet shape or a desired shape, preferably include a method of dry blending cellulose fiber particles and a thermoplastic resin, followed by melting, or a method of melt kneading them.

In the method of dry blending and then melting, the two are uniformly mixed by a tumbler blender, a ribbon blender, a V-form blender, a Henschel mixer, or the like, and then, an additive such as an antioxidant may be added to the mixture, if desired, followed by forming a cellulose fiber composite via a molten state.

Specifically, such a mixture is, for example, simply melted or melt-kneaded by, for example, a single screw or twin screw extruder, a roll, a Banbury mixer, a kneader or a Brabender. In a case of melt kneading, the two are melt-kneaded together with an additive such as an antioxidant which may be used, if desired.

For example, the melt kneading is carried out by means of a single screw or twin screw extruder, a roll, a Banbury mixer, a kneader, a Brabender, or the like. Thereafter, the mixture is extruded from a T-die to form a sheet shape or injected into a mold to form a desired shape.

Examples of the method (i) of mixing fibrillated cellulose fibers and a monomer solution or dispersion (solution or dispersion containing at least one solute or dispersion medium selected from a thermoplastic resin precursor, a thermosetting resin precursor, and a photocurable resin precursor), followed by removing the solvent, and polymerizing and curing to form a composite, include a method in which a solution or dispersion having solvent-soluble monomers dissolved therein is prepared and mixed with the fibrillated cellulose fibers.

In this method, it is preferable that the water serving as the dispersion medium (solvent) for the fibrillated cellulose fibers be substituted with an organic solvent, if desired. By polymerizing and curing the monomer in the mixed liquid or by removing the solvent and then polymerizing and curing the monomer, a cellulose fiber composite may be obtained.

Examples of the method (j) of mixing fibrillated cellulose fibers with a polymer solution or dispersion (thermoplastic resin solution or dispersion), and then removing the solvent to form a composite include a method in which a solvent-soluble polymer solution or dispersion is prepared and mixed with the cellulose dispersion. Here, it is preferable that the water serving as a solution for the fibrillated cellulose fibers be substituted with an organic solvent, if desired. By removing the solvent from the mixed liquid, a cellulose fiber composite may be obtained.

<Matrix Materials>

In the present invention, examples of the matrix materials other than cellulose to be combined with the cellulose fiber sheet, the cellulose fiber particles, the cellulose fiber gel, or the fibrillated cellulose fibers are shown below. However, the matrix material to be used in the present invention is not limited to the following Examples. Further, the thermoplastic resin, the thermosetting resin, and the photocurable (active energy ray-curable) resin in the present invention may be used as a mixture of two or more kinds thereof.

In the present invention, among the following matrix materials (polymeric materials or precursors therefor), preferred are the polymeric materials which are amorphous synthetic polymers having a high glass transition temperature (Tg) or the precursors which give polymers that are amorphous synthetic polymers having a high glass transition temperature (Tg), from the standpoint of obtaining a cellulose fiber composite having excellent transparency and high durability.

With respect to the degree of amorphousness of the synthetic polymer, the crystallinity is preferably 10% or less, and particularly preferably 5% or less. Further, the Tg of the synthetic polymer is preferably 110° C. or higher, more preferably 120° C. or higher, and particularly preferably 130° C. or higher.

In a case where the Tg of the synthetic polymer is within the above ranges, the composite may be prevented from being deformed when being brought into contact with, for example, hot water to prevent a problem in practical use. Further, from the standpoint of obtaining a cellulose fiber composite having a low water-absorbing property, it is preferable to select a polymeric material in which the content of the hydrophilic functional groups such as a hydroxyl group, a carboxyl group, and an amino group is low.

Incidentally, the Tg of the polymer material may be determined by a general method. For example, it is determined through the measurement by a DSC method. The crystallinity of a polymer may be calculated from the density of amorphous regions and the density of crystalline regions, and may also be calculated through a dynamic viscoelasticity measurement from tan $\delta$ that is a ratio between a modulus of elasticity and a viscosity coefficient.

(Thermoplastic Resin)

The thermoplastic resin is not particularly limited, but examples thereof include a styrene-based resin, an acryl-based resin, an aromatic polycarbonate-based resin, an aliphatic polycarbonate-based resin, an aromatic polyester-based resin, an aliphatic polyester-based resin, an aliphatic polyolefin-based resin, a cyclic olefin-based resin, a polyamide-based resin, a polyphenylene ether-based resin, a thermoplastic polyimide-based resin, a polyacetal-based resin, a polysulfone-based resin, and an amorphous fluorine-based resin.

(Thermosetting Resin)

The thermosetting resin is not particularly limited, but examples thereof include precursors for epoxy resins, acrylic resins, oxetane resins, phenolic resins, urea resins, melamine resins, unsaturated polyester resins, silicon resins, polyurethane resins, diallyl phthalate resins, and the like.

(Photocurable Resin)

The photocurable resin is not particularly limited, but examples thereof include precursors of epoxy resins, acryl resins, and oxetane resin, exemplified as the aforementioned thermosetting resin.

Specific examples of the thermoplastic resin, the thermosetting resin, and the photocurable resin include those described in JP-A-2009-299043.

(Other Components)

The thermoplastic resin, the thermosetting resin, and the photocurable resin are appropriately used as a composition (which will be hereinafter referred to as a curable composition) formed by mixing the resins with a chain transfer agent, an ultraviolet absorber, a filler, a silane coupling agent, or the like.

<Chain Transfer Agent>

The curable composition may contain a chain transfer agent so that the reaction thereof proceeds evenly. For example, polyfunctional mercaptan compounds having 2 or more thiol groups in the molecule may be used as a chain transfer agent, and thus, moderate toughness may be imparted to the cured product.

It is preferable to use one kind or two or more kinds of mercaptan compounds selected from, for example, pentaerythritol tetrakis(β-thiopropionate), trimethylolpropane tris(β-thiopropionate), tris[2-(β-thiopropionyloxyethoxy) ethyl]triisocyanurate, and the like. In a case of incorporating a mercaptan compound in the curable composition, the chain transfer agent is preferably incorporated in an amount of generally 30% by weight or less based on the total amount of the radically polymerizable compounds in the curable composition.

<Ultraviolet Absorber>

The curable composition may contain an ultraviolet absorber so that coloration is prevented. Examples of the ultraviolet absorber include ultraviolet absorbers selected from benzophenone-based ultraviolet absorbers and benzotriazole-based ultraviolet absorbers, and these ultraviolet absorbers may be used singly or in combination of two or more kinds thereof. In a case of incorporating an ultraviolet absorber in the curable composition, the ultraviolet absorber is incorporated in an amount of generally 0.01 to 1 part by weight based on 100 parts by weight of the total amount of the radically polymerizable compounds in the curable composition.

<Fillers Other than Cellulose>

The curable composition may contain fillers other than cellulose fibers. Examples of the fillers include inorganic particles and organic polymers. Specific examples thereof include inorganic particles such as silica particles, titania particles, and alumina particles, transparent cycloolefin polymers such as Zeonex (Nippon Zeon Co., Ltd.) and Arton (JSR Co., Ltd.), and general-purpose thermoplastic polymers such as polycarbonate and polymethylmethacrylate.

Among these, silica particles having a nanometer size are preferable since transparency can be maintained when such silica particles are used. Further, when a polymer which is akin in structure to the ultraviolet-curable monomer is used, the polymer can be dissolved up to a high concentration, which is thus preferable.

<Silane Coupling Agent>

A silane coupling agent may be added to the curable composition. Examples of the silane coupling agent include γ-((meth)acryloxypropyl)trimethoxysilane, γ-((meth)acryloxypropyl)methyldimethoxysilane, γ-((meth)acryloxypropyl)methyldiethoxysilane, γ-((meth)acryloxypropyl)triethoxysilane and γ-(acryloxypropyl)trimethoxysilane. These have a (meth)acryl group in the molecule and may be copolymerized with other monomers, which is thus preferable.

When the curable composition contains a silane coupling agent, the silane coupling agent may be generally incorporated in an amount of preferably 0.1 to 50% by weight, and more preferably 1 to 20% by weight, based on the total amount of the radically polymerizable compounds in the curable composition. By setting the blending amount of the silane coupling agent to the lower limit or more, the effect of incorporation of the silane coupling agent is sufficiently obtained. In addition, by setting the blending amount to the upper limit or less, optical characteristics of a cured product, such as transparency, may be prevented from being deteriorated.

<Polymerization Curing Step>

The curable composition for forming the cellulose fiber composite of the present invention may be polymerized and cured by a known method. Examples of the curing method include heat curing and radiation curing. Preferred is radiation curing.

Examples of the radiation include infrared rays, visible rays, ultraviolet rays, and electron beams, but light is preferable. More preferred is light having a wavelength of about 200 nm to 450 nm, and even more preferred are ultraviolet rays having a wavelength of 250 to 400 nm.

Specifically, examples of the method include a method in which a heat polymerization initiator which generates a radical by heating is added in advance to a curable composition and the composition is polymerized by heating (which will be hereinafter referred to as "heat polymerization" in some cases); a method in which a photopolymerization initiator which generates radicals by radiation such as ultraviolet rays, is added in advance to the curable composition and the composition is polymerized by irradiation with the radiation (which will be hereinafter referred to as "photopolymerization" in some cases), and a method in which a heat polymerization initiator and a photopolymerization initiator are added in advance in combination to the curable composition, and the composition is polymerized using heat and light in combination. In the present invention, photopolymerization is more preferred.

As the photopolymerization initiator, a photo-radical generator is usually used. As the photo-radical generator, known compounds which are known to be usable in this application may be used. Examples thereof include benzophenone, benzoin methyl ether, benzoin propyl ether, diethoxyacetophenone, 1-hydroxycyclohexyl phenyl ketone, 2,6-dimethylbenzoyldiphenylphosphine oxide, and 2,4,6-trimethylbenzoyldiphenylphosphine oxide. Among these, 2,4,6-trimethylbenzoyldiphenylphosphine oxide is preferred. These photopolymerization initiators may be used singly or in combination of two or more kinds thereof.

The amount of the photopolymerization initiator ingredient is preferably 0.001 parts by weight or more, preferably 0.05 parts by weight or more, and even more preferably 0.01 parts by weight or more, based on 100 parts by weight of the total amount of the radically polymerizable compounds in the curable composition. In general, the upper limit thereof is preferably 1 part by weight or less, more preferably 0.5 parts by weight or less, and even more preferably 0.1 parts by weight or less.

By setting the amount of the photopolymerization initiator added to the upper limit or less, the polymerization is prevented from proceeding rapidly, and the birefringence of the obtained cured product may be prevented from being increased, and the hue may also be improved.

For example, in a case where the amount of the photopolymerization initiator is set to 5 parts by weight, absorption by the initiator prevents the light from reaching the side opposite to the ultraviolet irradiation side, resulting in uncured areas. In addition, the composition yellows and the cured product has a considerably deteriorated hue. On the other hand, in a case where the amount thereof is too small, there is a possibility that polymerization might not proceed sufficiently even when ultraviolet irradiation is carried out.

The curable composition may further contain a heat polymerization initiator simultaneously. Examples of the heat polymerization initiator include hydroperoxides, dialkyl peroxides, peroxyesters, diacyl peroxides, peroxycarbonates, peroxyketals, and ketone peroxides.

Specific examples thereof include benzoyl peroxide, diisopropyl peroxycarbonate, t-butyl peroxy(2-ethylhexanoate) dicumyl peroxide, di-t-butyl peroxide, t-butyl peroxybenzoate, t-butyl hydroperoxide, diisopropylbenzene hydroperoxide, and 1,1,3,3-tetramethylbutyl hydroperoxide.

In a case where heat polymerization is initiated during light irradiation, the polymerization is difficult to control. It is therefore preferable that such heat polymerization initiators have a 1-minute half-life temperature of 120° C. or higher. Those polymerization initiators may be used singly or in combination of two or more kinds thereof.

The amount of the radiation to be irradiated at a time of curing is not limited so long as it is within a range in which the photopolymerization initiator generates radicals. However, exceedingly small amounts thereof result in incomplete polymerization to provide a cured product which does not have sufficient heat resistance and mechanical properties. Conversely, exceedingly large amounts thereof result in deteriorations of the cured product due to light, such as yellowing. As a result, ultraviolet rays, preferably having a wavelength of 300 to 450 nm, are irradiated, more preferably at 0.1 J/cm² to 200 J/cm², and even more preferably at 1 J/cm² to 20 J/cm², in accordance with the monomer composition and the kind and amount of the photopolymerization initiator.

It is more preferable that radiation be irradiated in installments. That is, when about 1/20 to 1/3 the overall irradiation amount is irradiated in the first operation and the required remainder is irradiated in the second and succeeding operations, a cured product having further reduced birefringence is obtained. Specific examples of the lamp to be used include a metal halide lamp, a high-pressure mercury lamp, an ultraviolet LED lamp, and an electrodeless mercury lamp.

For the purpose of rapidly completing the polymerization, photopolymerization and heat polymerization may be carried out simultaneously. In this case, the curable composition is heated at a temperature in the range of 30° C. to 300° C. simultaneously with irradiation of radiation to cure the composition. Although a heat polymerization initiator may be added to the curable composition in order to complete the polymerization in this case, addition of the heat polymerization initiator in a large amount results in a cured product having enhanced birefringence and an impaired hue. As a result, in general, the amount of the heat polymerization initiator to be used is preferably 0.1% by weight to 2% by weight, and more preferably 0.3% by weight to 1% by weight, based on the total amount of the radically polymerizable compounds in the curable composition.

<Laminated Structure>

A cellulose fiber composite obtained in the present invention may be a laminated structure composed of layers of the fiber cellulose fiber sheet obtained by the present invention and planar structure layers constituted of the polymers other than cellulose described above, or may be a laminated structure composed of the layers of the cellulose fiber sheet obtained in the present invention and the layers of the cellulose fiber composite obtained in the present invention. The number of the laminated layers and the laminated configurations are not particularly limited.

In addition, a laminate may be formed by superposing plural sheets of the cellulose fiber composite in the shape of a sheet or plate obtained in the present invention. At this time, a composite including the cellulose fibers and a resin sheet not including the cellulose fibers may be laminated.

In this case, in order to adhere the cellulose fiber composites to each other or adhere the resin sheet to the cellulose fiber composite, an adhesive is applied or an adhesive sheet may be interposed thereon. Further, the laminate may be integrated by applying a hot press treatment.

<Inorganic Film>

The cellulose fiber composite obtained in the present invention each may be a composite that includes a cellulose fiber composite layer on which an inorganic film has been further laminated or may be the laminated structure described above which further has an inorganic film laminated thereon, according to applications thereof.

The inorganic film to be used here is appropriately determined according to applications of the cellulose fiber composite. Examples thereof include metals such as platinum, silver, aluminum, gold, and copper, silicon, ITO, $SiO_2$, SiN, $SiO_xN_y$, ZnO, and TFT. A combination thereof and a film thickness may be designed arbitrarily.

<Characteristics or Physical Properties of Cellulose Fiber Composite>

Suitable characteristics or physical properties of the cellulose fiber composite obtained in the present invention will be described below.

(Cellulose Content)

The content of the cellulose (content of the cellulose fibers) in the cellulose fiber composite of the present invention is usually from 1% by weight to 99% by weight, and the content of the matrix materials other than cellulose is preferably from 1% by weight to 99% by weight.

In order to exhibit a low linear expansion property, it is preferable that the content of cellulose be 1% by weight or more and the content of the matrix materials other than cellulose be 99% by weight or less.

In order to exhibit transparency, it is preferable that the content of cellulose be 99% by weight or less and the content of the matrix materials other than cellulose be 1% by weight or more.

More preferred ranges are 5% by weight to 90% by weight for cellulose and 10% by weight to 95% by weight for the matrix materials other than cellulose. Even more preferred ranges are 10% by weight to 80% by weight for cellulose and 20% by weight to 90% by weight for the matrix materials other than cellulose.

It is particularly preferable that the content of cellulose be from 30% by weight to 70% by weight and the content of the matrix materials other than cellulose be from 30% by weight to 70% by weight.

The contents of cellulose and the matrix materials other than cellulose in a cellulose fiber composite may be determined, for example, from the weight of the cellulose fibers before composite formation and the weight of the cellulose fiber composite after composite formation.

It is also possible to use a method in which the cellulose fiber composite is immersed in a solvent in which the matrix materials are soluble, and the contents are determined from the weight of the residual cellulose fibers after removing the matrix materials only. Otherwise, a method in which the contents are determined from the specific gravity of the resin that is a matrix material and a method in which the amounts of the functional groups of the resin or cellulose are determined by NMR or IR may be used to determine the contents.

(Thickness)

The thickness of the cellulose fiber composite obtained in the present invention is preferably from 10 μm to 10 cm. By setting the thickness to such a value, the composite may retain strength required of a structural material. The thickness of the cellulose fiber composite is more preferably from 50 μm to 1 cm, and even more preferably from 80 μm to 250 μm.

Furthermore, the cellulose fiber composite obtained in the present invention is, for example, in the form of a film or plate having such a thickness. However, the shape thereof is not limited to such a flat film or flat plate, and the composite may be in the form of a film or plate having a curved surface. Further, the composite may have any of other various shapes. In addition, the composite does not always need to have an even thickness, and the thickness thereof may differ partly.

(Coloration)

The cellulose fiber composite obtained by the present invention may have low coloration by heating.

That is, the cellulose fiber composite obtained by the present invention has low coloration even when a heating step is included, due to the effect of the reduction step described above, and may endure a heating treatment or the like sufficiently in the step for making practical devices, such as a transparent substrate of various types of devices.

The cellulose fiber composite obtained in the present invention after heating, as measured in the section of Examples as described later, has a YI, which indicates a degree of non-coloration, of preferably 30 or less, and particularly preferably 10 or less.

(Haze)

The cellulose fiber composite obtained by the present invention may be a cellulose fiber composite having high transparency, that is, a low haze.

When the cellulose fiber composite is used as various transparent materials, the haze value of the cellulose fiber composite is preferably 2.0 or less, more preferably 1.8 or less, and particularly preferably 1.5 or less. By setting the haze to the above ranges, it may be prevented that it substantially becomes difficult to apply the cellulose fiber composite in a transparent substrate or the like of various devices.

For a cellulose fiber composite having a thickness of 10 to 100 μm, the haze may be measured, for example, by a haze meter manufactured by Suga Test Instruments Co., Ltd., whereby a value of a light source C is employed.

(Total Light Transmittance)

The cellulose fiber composite obtained by the present invention may be a cellulose fiber composite having high transparency, that is, a low haze. It is preferable that when the cellulose fiber composite is used as various transparent materials, the cellulose fiber composite preferably has a total light transmittance, as measured along the thickness direction thereof in accordance with JIS Standard K7105 (1981) of 60% or more, more preferably 70% or more, even more preferably 80% or more, and particularly preferably 90% or more. By setting the total light transmittance within the above ranges, the composite is inhibited from being translucent or opaque and it is prevented that it becomes difficult to be used in applications where transparency is required.

For a cellulose fiber composite having a thickness of 10 to 100 μm, the total light transmittance may be measured, for example, by a haze meter manufactured by Suga Test Instruments Co., Ltd., whereby a value of a light source C is employed.

(Coefficient of Linear Expansion)

The cellulose fiber composite obtained by the present invention may be a cellulose fiber composite with a low coefficient of linear expansion because of the use of cellulose having a low coefficient of linear expansion (degree of elongation per K). The coefficient of linear expansion of the cellulose fiber composites is preferably from 1 to 50 ppm/K, more preferably from 1 to 30 ppm/K, and particularly preferably from 1 to 20 ppm/K.

That is, in substrate applications, for example, inorganic thin-film transistors have a coefficient of linear expansion of about 15 ppm/K. As a result, by setting the coefficient of linear expansion of the cellulose fiber composite to the upper limit or less, the difference in the rates of linear expansion of the two layers when forming a laminated composite with the inorganic film is inhibited, whereby the generation of cracks or the like can be prevented. Therefore, the coefficient of linear expansion of the cellulose fiber composite is particularly preferably from 1 to 20 ppm/K.

Moreover, the coefficient of linear expansion is measured by the method which will be described in the section of Examples as described later.

(Tensile Strength)

The cellulose fiber composite obtained by the present invention has a tensile strength of preferably 40 MPa or more, and more preferably 100 MPa or more. By setting the tensile strength to the above ranges, sufficient strength is obtained and there is no influence on the use in applications where force is applied, such as structural materials.

(Tensile Modulus of Elasticity)

The cellulose fiber composite obtained by the present invention has a tensile modulus of elasticity of preferably 0.2 to 100 GPa, more preferably 1 to 50 GPa, and even more preferably 5.0 to 30 GPa. By setting the tensile modulus of elasticity to the lower limit or more, sufficient strength is obtained and there is no influence on use in applications where force is applied, such as structural materials.

<Applications>

The cellulose fiber composite obtained by the present invention has high transparency, high strength, a low water-absorbing property, high transparency, low coloration, and a low haze, and is excellent in optical characteristics, and as a result, it is suitable for use in displays such as liquid crystal displays, plasma displays, organic EL displays, field emission displays, and rear projection televisions, or as a substrate and a panel. Further, the cellulose fiber composite is also suitable as a substrate for solar cells such as silicon-based solar cells and dye-sensitized solar cells.

For a use as a substrate, a barrier film, ITO, TFT, or the like may be laminated on the substrate. In particular, the cellulose fiber composite obtained by the present invention has low coloration even when carrying out a heating treatment, and can endure the heating treatment in the step for making practical devices, such as a transparent substrate of various types of devices.

Moreover, the cellulose fiber composite of the present invention may be suitably used for window materials for automobiles, window materials for railroad vehicles, window materials for dwelling houses, window materials for offices and factories, and the like. In use for window materials, a film such as a fluorine-coated film or hardcoat film, or a material having impact resistance or light resistance may be laminated, if desired.

The cellulose fiber composite of the present invention may be used also as a structure in applications other than transparent materials so as to take advantage of the characteristics thereof, such as a low coefficient of linear expansion, a high modulus of elasticity, and high strength. In particular, the composite is suitably used as automotive materials such as interior materials, exterior plates, and bumpers, the PC housings, parts of domestic electrical appliances, packaging materials, building materials, materials for civil engineering works, materials for fisheries, other industrial materials, or the like.

EXAMPLES

Hereinbelow, the present invention will be described in more detail with reference to Preparation Examples, Examples, and Comparative Examples. However, the present invention should not be construed as being limited to the following Examples unless it departs from the spirit thereof.

Furthermore, the methods for measuring the YI value of the cellulose fiber assembly obtained by the present invention, and the cellulose content, the YI value, the haze, the total light transmittance, and the coefficient of linear expansion of the cellulose fiber composite are as follows.

[Cellulose Content in Cellulose Fiber Composite]

The cellulose content (% by weight) was determined from the weight of the cellulose fiber assembly used for composite formation and the weight of the cellulose fiber composite thus obtained.

[YI Value of Cellulose Fiber Assembly and YI Value of Cellulose Fiber Composite]

The YI value was measured using a color computer manufactured by Suga Test Instruments Co., Ltd. A larger YI value indicates stronger coloration.

[Haze of Cellulose Fiber Composite]

The haze value by a light source C was measured using a haze meter manufactured by Suga Test Instruments Co., Ltd.

[Total Light Transmittance of Cellulose Fiber Composite]

The total light transmittance by a light source C was measured using a haze meter manufactured by Suga Test Instruments Co., Ltd. in accordance with JIS Standard K7105 (1981).

[Coefficient of Linear Expansion of Cellulose Fiber Composite]

The cellulose fiber composite was cut into a size with a width of 3 mm by a length of 40 mm with a laser cutter. This test piece was examined with TMA6100, manufactured by SII, in the tensile mode in a nitrogen atmosphere under the conditions of a chuck-to-chuck distance of 20 mm and a load of 10 g in the following manner. The test piece was heated from room temperature to 180° C. at 5° C./min, subsequently cooled from 180° C. to 25° C. at 5° C./min, and further heated from 25° C. to 180° C. at 5° C./min, and the coefficient of linear expansion was determined from the values measured in the range of 60° C. to 100° C. during the second heating.

Preparation of Cellulose Fiber Raw Materials

Preparation Example 1 of Cellulose Fiber Raw Materials

Wood flour (Oregon Pine) was degreased with a 2% by weight aqueous solution of sodium carbonate at 90° C. for 4 hours and the resultant was washed with desalted water to obtain degreased wood flour. The degreased wood flour was delignified by treating it with a peracetic acid/persulfuric acid mixture of acetic anhydride:concentrated sulfuric acid:hydrogen peroxide=1:1.5:1 (molar ratio) at 90° C. for 1 hour (pxa method). Lastly, the resultant was washed with desalted water to obtain delignification-treated wood flour.

The delignification-treated wood flour thus obtained was immersed in a 5% by weight aqueous potassium hydroxide solution for 16 hours to perform a hemicellulose removal treatment. The resultant was washed with desalted water to obtain hemicellulose removal-treated cellulose fiber raw materials. These cellulose fiber raw materials are referred to as "cellulose fiber raw materials 1".

Preparation Example 2 of Cellulose Fiber Raw Materials

Wood flour (Oregon Pine) was degreased with a 2% by weight aqueous solution of sodium carbonate at 90° C. for 4 hours and the resultant was washed with desalted water to obtain degreased wood flour. The degreased wood flour was treated with a 10% by weight aqueous nitric acid solution at 80° C. for 2 hours, and then washed with desalted water. Next, the resultant was treated with a 1% by weight aqueous sodium hydroxide solution at 95° C. for 1 hour and then washed with desalted water to obtain delignification-treated wood flour.

The delignification-treated wood flour thus obtained was immersed in a 5% by weight aqueous potassium hydroxide solution for 16 hours to perform a hemicellulose removal treatment. The resultant was washed with desalted water to obtain hemicellulose removal-treated cellulose fiber raw materials. These cellulose fiber raw materials are referred to as "cellulose fiber raw materials 2".

Preparation Example 3 of Cellulose Fiber Raw Materials

Wood flour (Oregon Pine) was degreased with a 2% by weight aqueous solution of sodium carbonate at 90° C. for 4 hours and the resultant was washed with desalted water to obtain degreased wood flour. The degreased wood flour was delignified by treating it with an aqueous peracetic acid solution at 90° C. for 1 hour (pa method).

Lastly, the resultant was washed with desalted water to obtain delignification-treated wood flour. The delignification-treated wood flour thus obtained was immersed in a 5% by weight aqueous potassium hydroxide solution for 16 hours to perform a hemicellulose removal treatment. The resultant was washed with desalted water to obtain hemicellulose removal-treated cellulose fiber raw materials. These cellulose fiber raw materials are referred to as "cellulose fiber raw materials 3".

Preparation Example 4 of Cellulose Fiber Raw Materials

The cellulose fiber raw materials obtained in Preparation Example 3 were further subjected to a bleaching treatment (80° C., 1 hour) in an aqueous chlorine dioxide solution (at a concentration of chlorine dioxide of 3% by weight, based on the dry weight of the cellulose fibers), and the resultant was washed with desalted water to obtain cellulose fiber raw materials. These cellulose fiber raw materials are referred to as "cellulose fiber raw materials 4".

Preparation Example 5 of Cellulose Fiber Raw Materials

Wood flour (Oregon Pine) was degreased with a 2% by weight aqueous solution of sodium carbonate at 80° C. for 6 hours and the resultant was washed with desalted water to obtain degreased wood flour. The degreased wood flour was delignified by treating it with sodium chlorite at 80° C. for 5.5 hours under an acidic condition with acetic acid (Wise's method).

Lastly, the resultant was washed with desalted water to obtain delignification-treated wood flour. The delignification-treated wood flour thus obtained was immersed in a 5% by weight aqueous potassium hydroxide solution for 16 hours to perform a hemicellulose removal treatment. The resultant was washed with desalted water to obtain hemicellulose removal-treated cellulose fiber raw materials. These cellulose fiber raw materials are referred to as "cellulose fiber raw materials 5".

Preparation and Evaluation of Cellulose Fiber Assembly

Example 1

The cellulose fiber raw materials 1 (dry weight of 15 g) were placed in a 1.8-L brown glass bottle, and water was added thereto to give a total amount of 600 g. Further, 6.19 g sodium hydroxide was added thereto and the mixture was stirred and dissolved.

1.05 g (7% by weight based on cellulose fiber raw material) of sodium borohydride as a reducing agent was added thereto, and the mixture was stirred (pH 12). The glass bottle was placed in a bath at 95° C. to undergo a reaction for 1 hour, thereby carrying out a reduction treatment. After the reaction, the mixture was cooled to 50° C. or lower, and the cellulose fiber raw materials and the treatment liquid were separated by filtration using filter paper. Further, the obtained cellulose fiber raw materials were suspended in and washed with 5 L of water. Filtration, and suspending and washing with 5 L of water were carried out twice in total. Thereafter, the resultant was filtered to obtain reduction-treated cellulose fiber raw materials.

The reduction-treated cellulose fiber raw materials were used to give a 0.5% by weight aqueous suspension, and the suspension was fibrillated at 21500 rpm for 1 hour with a high-speed rotary homogenizer ("CLEARMIX 2.2S" manufactured by M TECHNIQUE Co., Ltd.).

The obtained fibrillated cellulose fiber dispersion (fibrillated cellulose fibers) was subjected to a centrifugation treatment ("H-2000B" 12000G manufactured by KOKUSAN) for 10 minutes to obtain a supernatant.

The solid content concentration of the obtained supernatant was adjusted to 0.2% by weight, and the resultant was suction-filtered using a PTFE-made membrane filter (pore diameter of 0.5 μm). The obtained cellulose fiber assembly was dried with a cylindrical dryer (90° C.) in an oven (130° C.) to obtain a sheet-shaped cellulose fiber assembly (cellulose fiber sheet).

For this cellulose fiber assembly, the thickness was 60 μm, the YI value before heating was 0.4, and the YI value after the heating treatment in a vacuum oven at 190° C. for 4 hours was 8.8.

Examples 2 to 13

By the method described in Example 1, except that the cellulose fiber raw materials used or the reduction treatment conditions were changed into the condition described in Table 1, each cellulose fiber assembly was prepared.

Furthermore, the reduction treatment in Examples 2 to 4 was carried out in the same manner as in Example 1 except that a reducing agent shown in Table 1 was used instead of sodium borohydride. In addition, Further, the reduction treatment in Examples 5 to 11 was carried out in the same manner as in Example 1 except that the amount of sodium borohydride used was changed.

For the cellulose fiber assembly, the YI value before heating and the YI value after the heating treatment in a vacuum oven at 190° C. for 4 hours are shown in Table 1.

Comparative Examples 1, and 3 to 5

As the cellulose fiber raw materials, those shown in Table 1 were used, while not carrying out a reduction treatment, to give a 0.5% by weight aqueous suspension, which was then subjected to a fibrillation treatment, centrifugation, suction-filtration, and drying by the methods described in Example 1, thereby obtaining each cellulose fiber assembly.

For the cellulose fiber assembly, the YI value before heating and the YI value after the heating treatment in a vacuum oven at 190° C. for 4 hours are shown in Table 1.

Comparative Example 2

A cellulose fiber assembly was prepared in the same manner as in Example 1 except for using aqueous hydrogen peroxide instead of sodium borohydride. For the cellulose fiber assembly, the YI value before heating and the YI value after the heating treatment in a vacuum oven at 190° C. for 4 hours are shown in Table 1.

Example 14

By the method described in Example 1, the cellulose fiber raw materials 3 were subjected to a reduction treatment to obtain reduction-treated cellulose fibers.

By carrying out the step of dispersing the reduction-treated cellulose fibers in acetic acid and filtering them three times, water in the cellulose fiber was substituted with acetic acid. 1 g (dry weight) of the cellulose fibers was mixed with 20 ml of acetic acid and 10 ml of acetic anhydride at the dictated ratio, and cellulose fibers substituted with acetic acid was added thereto.

Thereafter, while stirring the mixture to undergo a reaction at 100° C. for 3 hours, the cellulose fibers were subjected to a chemical modification treatment (acetylation treatment). After the reaction, the reaction liquid was filtered, and washed with methanol and desalted water in this order to obtain chemical modification-treated cellulose fibers. The chemical modification rate of these cellulose fibers was 12.7%.

The obtained chemical modification-treated cellulose fibers were subjected to a fibrillation treatment, centrifugation, suction-filtration, and drying by the methods described in Example 1, to obtain a cellulose fiber assembly. For the cellulose fiber assembly, the YI value before heating was 5.3 and the YI value after the heating treatment in a vacuum oven at 190° C. for 4 hours was 14.0.

Example 15

The cellulose fiber raw materials 4 were subjected to a reduction treatment by the method described in Example 1 to obtain reduction-treated cellulose fibers. From the reduction-treated cellulose fibers, chemical modification-treated (acetylation-treated) cellulose fibers were obtained in the same manner as in Example 14. The chemical modification rate of these cellulose fibers was 8.7%.

The obtained chemical modification-treated cellulose fibers were subjected to a fibrillation treatment, centrifugation, suction-filtration, and drying, by the methods described in Example 1, to obtain a cellulose fiber assembly. For the cellulose fiber assembly, the YI value before heating was 3.3 and the YI value after the heating treatment in a vacuum oven at 190° C. for 4 hours was 15.7.

TABLE 1

| | Cellulose fiber raw material No | Conditions for reduction treatment | | Conditions for chemical modification treatment | | YI value of cellulose fiber assembly | |
|---|---|---|---|---|---|---|---|
| | | Reducing agent | Amount of reducing agent* | Chemical modifier | Chemical modification rate (mol %) | Before heating | After heating |
| Example 1 | 1 | Sodium borohydride | 7 | None | — | 0.4 | 8.8 |
| Example 2 | 1 | Sodium sulfite/ dithionite sodium | 7 | None | — | 0.8 | 10.8 |
| Example 3 | 1 | Thiourea dioxide | 7 | None | — | 0.6 | 14.9 |
| Example 4 | 1 | Hydrazine | 7 | None | — | 3.9 | 14.5 |
| Example 5 | 1 | Sodium borohydride | 1 | None | — | 0.9 | 16.2 |
| Example 6 | 1 | Sodium borohydride | 4 | None | — | 1.0 | 17.2 |
| Example 7 | 1 | Sodium borohydride | 5 | None | — | 0.7 | 12.2 |
| Example 8 | 1 | Sodium borohydride | 10 | None | — | 0.6 | 8.3 |
| Example 9 | 1 | Sodium borohydride | 30 | None | — | 1.3 | 7.0 |
| Example 10 | 1 | Sodium borohydride | 50 | None | — | 2.9 | 15.5 |
| Example 11 | 1 | Sodium borohydride | 100 | None | — | 2.7 | 18.3 |
| Comparative Example 1 | 1 | No reducing agent | None | None | — | 1.7 | 22.1 |
| Comparative Example 2 | 1 | No reducing agent (treatment with aqueous hydrogen peroxide) | 7 | None | — | 0.4 | 38.3 |
| Example 12 | 2 | sodium borohydride | 7 | None | — | — | 23.4 |
| Comparative Example 3 | 2 | No reducing agent | None | None | — | — | 28.4 |
| Example 13 | 3 | Sodium borohydride | 7 | None | — | 13.5 | 32.9 |
| Example 14 | 3 | Sodium borohydride | 7 | Acetyl group | 12.7 | 5.3 | 14.0 |
| Comparative Example 4 | 3 | No reducing agent | None | None | — | 19.5 | 64.3 |
| Example 15 | 4 | Sodium borohydride | 7 | Acetyl group | 8.7 | 3.3 | 15.7 |
| Comparative Example 5 | 4 | No reducing agent | None | None | — | 2.5 | 25.1 |

*Amount (% by weight) to be used based on the cellulose fiber raw material

Preparation and Evaluation of Cellulose Fiber Composite

Example 16

The cellulose fiber raw materials 1 were subjected to a reduction treatment by the method described in Example 1 to obtain reduction-treated cellulose fibers. 0.5% by weight of the obtained cellulose fiber raw materials were used to give an aqueous suspension, and subjected to a fibrillation treatment at 20000 rpm for 1 hour with a high-speed rotary homogenizer ("CLEARMIX 0.8S" manufactured by M TECHNIQUE Co., Ltd.).

The solid content concentration of this fibrillated cellulose fiber dispersion was adjusted to 0.127% by weight, and suction-filtered using a PTFE-made membrane filter (pore diameter of 1.0 μm). The obtained cellulose fiber assembly was dried for 5 minutes with a pressurizing pressing machine (120° C.) to obtain a sheet-shaped cellulose fiber assembly (cellulose fiber sheet). The thickness of this fiber assembly was 60 μm.

This cellulose fiber assembly was immersed in a mixed solution of 100 parts by weight of 1,10-decanediol diacrylate, 0.02 parts by weight of 2,4,6-trimethylbenzoyldiphenylphosphinoxide ("LUCIRIN TPO" manufactured by BASF), and 0.01 parts by weight of benzophenone, and left to stand overnight under reduced pressure.

The cellulose fiber assembly immersed with the resin solution was sandwiched between two glass plates and irradiated with ultraviolet rays using an electrodeless mercury lamp ("Bulb D" manufactured by Fusion UV Systems, Inc.). Under the conditions for ultraviolet curing that the irradiation intensity at a wavelength of 365 nm was 400 mW/cm$^2$, the cellulose fiber assembly was semi-cured while being passed through, turning the surfaces twice in total at a line speed of 7 m/min, and subsequently, completely cured while being passed through, turning the surfaces twice, respectively, (4 times in total) at a line speed of 2 m/min, under the conditions of an irradiation intensity of 1900 mW/cm$^2$ at a wavelength of 365 nm. After the ultraviolet irradiation, the glass plates were removed to obtain a cellulose fiber composite.

The thickness of this cellulose fiber composite was 80 μm. Further, for this cellulose fiber composite, the YI value before heating was 1.5 and the YI value after the heating treatment in an oven at 200° C. (under a nitrogen gas atmosphere) for 4 hours was 11.3. The values of the other physical properties of the cellulose fiber composites are shown in Table 2B.

Example 17

The fibrillated cellulose fiber dispersion obtained after carrying out the reduction treatment and then the fibrillation treatment with a high-speed rotary homogenizer in Example 16 was diluted with water to give a solid content concentration of 0.2% by weight, and further, tuning was carried out at an output volume of 8 using a straight type chip in 36 mmϕ (made of a titanium alloy), and the ultrasonic treatment was carried out for 30 minutes using an optimal tuning position, with an ultrasonic homogenizer "UH-600S" manufactured by SMT Co., Ltd. (frequency of 20 kHz, effective output density of 22 W/cm$^2$). The treatment was carried out while cooling the fibrillated cellulose fiber dispersion with cold water at 5° C. from outside the treatment vessel, and stirring the dispersion with a magnetic stirrer.

The ultrasonic-treated dispersion was subjected to 10-minute centrifugal separation at 18000 rpm (38900 G) to obtain a supernatant. The obtained supernatant contained fibrillated cellulose fibers and the solid content concentration of the supernatant was 0.14% by weight.

The solid content concentration of the obtained supernatant was adjusted to 0.127% by weight, and suction-filtered and dried in the same manner as in Example 16 to obtain a cellulose fiber assembly, and then obtain a cellulose fiber composite in the same manner. For this cellulose fiber composite, the YI value before heating was 1.0 and the YI value after the heating treatment in an oven at 200° C. (under a nitrogen gas atmosphere) for 4 hours was 13.7. The values of the other physical properties are shown in Table 2B.

Examples 18, 20, 23, and 26

The respective cellulose fiber composites were obtained by the method described in Example 16, using the cellulose fiber raw materials shown in Table 2A. The values of the other physical properties of the respective cellulose fiber composites are shown in Table 2B.

Examples 19, 21, 24, and 27

The respective cellulose fiber composites were obtained by the method described in Example 16, except that a reduction treatment was carried out and a chemical modification treatment was carried out in the same manner as in Example 15, using the cellulose fiber raw materials shown in Table 2A. The values of the other physical properties of the respective cellulose fiber composites are shown in Table 2B.

Examples 22, 25, and 28

The respective cellulose fiber composites were obtained by the method described in Example 17, except that a reduction treatment was carried out and a chemical modification treatment is carried out in the same manner as in Example 15, using the cellulose fiber raw materials shown in Table 2A. The values of the other physical properties of the respective cellulose fiber composites are shown in Table 2B.

Comparative Examples 6, 7, and 9

The respective cellulose fiber composites were obtained by the method described in Example 16, except that a reduction treatment was not carried out, using the cellulose fiber raw materials shown in Table 2A. The values of the other physical properties of the respective cellulose fiber composites are shown in Table 2B.

Comparative Examples 8 and 10

The respective cellulose fiber composites were obtained by the method described in Example 17, except that a reduction treatment was not carried out, using the cellulose fiber raw materials shown in Table 2A. The values of the other physical properties of the respective cellulose fiber composites are shown in Table 2B.

Furthermore, in Table 2B, "after heating" means "after the heating treatment in an oven at 200° C. (nitrogen gas atmosphere) for 4 hours" in any case.

TABLE 2A

| | Cellulose fiber raw material No | Conditions for reduction treatment | | Conditions for chemical modification treatment | | Method for fibrillation treatment |
|---|---|---|---|---|---|---|
| | | Reducing agent | Amount of reducing agent* | Chemical modifier | Chemical modification rate (mol %) | |
| Example 16 | 1 | Sodium borohydride | 7 | None | — | High-speed rotary homogenizer |
| Example 17 | 1 | Sodium borohydride | 7 | None | — | High-speed rotary homogenizer and ultrasonic treatment |
| Comparative Example 6 | 1 | No reducing agent | None | None | — | High-speed rotary homogenizer |
| Example 18 | 2 | Sodium borohydride | 7 | None | — | High-speed rotary homogenizer |
| Example 19 | 2 | Sodium borohydride | 7 | Acetyl group | 10.0 | High-speed rotary homogenizer |
| Example 20 | 3 | Sodium borohydride | 7 | None | — | High-speed rotary homogenizer |
| Example 21 | 3 | Sodium borohydride | 7 | Acetyl group | 12.7 | High-speed rotary homogenizer |
| Example 22 | 3 | Sodium borohydride | 7 | Acetyl group | 12.7 | High-speed rotary homogenizer and ultrasonic treatment |
| Comparative Example 7 | 3 | No reducing agent | None | None | — | High-speed rotary homogenizer |
| Example 23 | 4 | Sodium borohydride | 7 | None | — | High-speed rotary homogenizer |
| Example 24 | 4 | Sodium borohydride | 7 | Acetyl group | 8.7 | High-speed rotary homogenizer |
| Example 25 | 4 | Sodium borohydride | 7 | Acetyl group | 8.7 | High-speed rotary homogenizer and ultrasonic treatment |
| Comparative Example 8 | 4 | No reducing agent | None | None | — | High-speed rotary homogenizer and ultrasonic treatment |
| Example 26 | 5 | Sodium borohydride | 7 | None | — | High-speed rotary homogenizer |
| Example 27 | 5 | Sodium borohydride | 7 | Acetyl group | 11.7 | High-speed rotary homogenizer |
| Example 28 | 5 | Sodium borohydride | 7 | Acetyl group | 11.7 | High-speed rotary homogenizer and ultrasonic treatment |
| Comparative Example 9 | 5 | No reducing agent | None | None | — | High-speed rotary homogenizer |
| Comparative Example 10 | 5 | No reducing agent | None | None | — | High-speed rotary homogenizer and ultrasonic treatment |

*Amount (% by weight) to be used based on the cellulose fiber raw material

TABLE 2B

| | Values of physical properties of cellulose fiber composite | | | | | | | |
|---|---|---|---|---|---|---|---|---|
| | Content (% by weight) of cellulose | Total light transmittance (%) | | Coefficient of linear expansion (ppm/K) | Haze | | YI value | |
| | | Before heating | After heating | | Before heating | After heating | Before heating | After heating |
| Example 16 | 45.3 | 93.3 | 90.6 | 24.1 | 68.2 | 73.9 | 1.5 | 11.3 |
| Example 17 | 48.2 | 91.0 | 86.7 | 9.8 | 1.5 | 2.2 | 1.0 | 13.7 |
| Comparative Example 6 | 46.6 | 90.3 | 79.9 | 19.6 | 44.4 | 55.3 | 1.8 | 32.8 |
| Example 18 | 50.9 | 91.2 | 84.3 | 20.2 | 51.5 | 60.8 | 2.4 | 14.5 |
| Example 19 | 54.6 | 92.0 | 90.9 | — | 49.6 | 61.7 | 1.4 | 6.9 |
| Example 20 | 43.4 | 86.4 | 73.2 | 11.2 | 45.4 | 56.7 | 8.2 | 32.1 |
| Example 21 | 49.1 | 90.1 | 90.0 | 8.5 | 53.2 | 59.4 | 2.1 | 4.7 |
| Example 22 | 44.6 | 89.4 | 84.1 | 9.0 | 12.2 | 15.9 | 1.5 | 11.8 |
| Comparative Example 7 | 45.4 | 86.5 | 61.5 | 11.4 | 39.8 | 49.4 | 7.8 | 60.7 |
| Example 23 | 47.0 | 90.0 | 76.3 | 17.1 | 53.3 | 61.4 | 1.9 | 32.1 |
| Example 24 | 52.0 | 89.8 | 90.4 | 12.8 | 49.5 | 58.5 | 1.3 | 4.0 |
| Example 25 | 53.6 | 90.6 | 90.6 | 7.8 | 3.7 | 3.7 | 1.0 | 7.4 |
| Comparative Example 8 | 52.1 | 89.3 | 89.3 | 9.8 | 13.4 | 13.4 | 2.5 | 38.4 |
| Example 26 | 50.0 | 88.1 | 87.8 | 8.1 | 33.8 | 44.5 | 3.2 | 67.2 |
| Example 27 | 50.0 | 88.8 | 89.5 | 16.3 | 58.6 | 62.9 | 3.1 | 7.8 |
| Example 28 | 55.4 | 89.7 | 87.5 | 13.1 | 1.6 | 2.7 | 2.8 | 10.8 |
| Comparative Example 9 | 49.0 | 89.7 | 54.0 | 13.9 | 34.4 | 44.2 | 3.4 | 85.8 |
| Comparative Example 10 | 59.9 | 90.2 | 53.7 | 10.5 | 2.5 | 2.1 | 3.1 | 91.2 |

Evaluation of Effects of Reduction Treatment for Cellulose Fiber Assembly

Example 29

Using the cellulose fiber raw materials 5, a fibrillation treatment, suction-treatment, and drying were carried out by the methods described in Example 17 while not carrying out a reduction treatment, a cellulose fiber assembly (i) was obtained.

The values of the physical properties of the cellulose fiber assembly and the cellulose fiber composite obtained in Examples 29 to 30 and Comparative Examples 11 are shown in Table 3.

Furthermore, in Table 3, "after heating" of the cellulose fiber assembly and "after heating" of the cellulose fiber composite both mean "after the heating treatment in an oven at 200° C. (nitrogen gas atmosphere) for 4 hours".

TABLE 3

| | Presence or absence of reduction treatment | Presence or absence of chemical modification treatment | YI value of cellulose fiber assembly Before heating | YI value of cellulose fiber assembly After heating | Content (% by weight) of cellulose | Total light transmittance (%) Before heating | Total light transmittance (%) After heating | Coefficient of linear expansion (ppm/K) | Haze Before heating | Haze After heating | YI value Before heating | YI value After heating |
|---|---|---|---|---|---|---|---|---|---|---|---|---|
| Example 29 | Presence | Absence | 8.5 | 81.0 | 57.4 | 91.2 | 70.9 | 12 | 1.56 | 2.1 | 1.5 | 52.5 |
| Example 30 | Presence | Presence | 7.5 | 35.0 | 59.9 | 91.4 | 90.3 | 10.1 | 1.7 | 2.1 | 1.6 | 5.0 |
| Comparative Example 11 | Absence | Absence | 10.3 | 84.1 | 59.9 | 90.2 | 53.7 | 10.5 | 2.5 | 2.1 | 3.1 | 91.2 |

The obtained cellulose fiber assembly (i) was placed in a beaker, and a treatment liquid (pH 12) containing 6.19 g of sodium hydroxide and 1.05 g of sodium borohydride as a reducing agent was injected thereinto to undergo a reaction at 90° C. for 1 hour, thereby carrying out a reduction treatment (the amount of the reducing agent used was 7% by weight based on the cellulose fiber assembly).

After the reaction, the resultant was washed with an aqueous acetic acid solution and distilled water, and dried in a pressurizing press machine (120° C.) for 5 minutes to obtain a reduction-treated cellulose fiber assembly (ii). Further, this cellulose fiber assembly (ii) was formed into a composite with a resin in the same manner as in Example 16 to obtain a cellulose fiber composite.

Example 30

The cellulose fiber assembly (ii) obtained in Example 29 was placed in a beaker, and subjected to a chemical modification treatment (acetylation) in the same manner as in Example 14. After the reaction, the resultant was washed with methanol and distilled water, and dried in a pressurizing press machine (120° C.) for 5 minutes to obtain a cellulose fiber assembly (iii).

The chemical modification rate of this cellulose fiber assembly (iii) was 14.3 mol %. Further, this cellulose fiber assembly (iii) was formed into a composite with a resin in the same manner as in Example 16 to obtain a cellulose fiber composite.

Comparative Example 11

In the same manner as in Example 30 except that a reduction treatment was not carried out, a cellulose fiber composite was obtained.

As shown in any of Examples described in Tables 1 to 3, it became apparent that an increase in the YI values after heating of the obtained cellulose fiber assembly and cellulose fiber composite can be inhibited by carrying out a reduction treatment in several steps until preparing the cellulose fiber assembly from the cellulose fiber raw material.

In particular, as shown in Examples 14, 15, 19, 21, and the like, by combining the reduction treatment with the chemical modification treatment, the effect of inhibiting an increase in the YI values was apparently obtained, and a cellulose fiber composite having high property, high transparency, non-coloration, high heat resistance, and a low coefficient of linear expansion was obtained.

Although the present invention was described in detail with reference to specific embodiments, it is apparent to a person skilled in the art that various alterations and modifications may be made without departing from the spirit and the scope of the present invention. However, the present application is based on Japanese Patent Application No. 2010-256051 filed on Nov. 16, 2010, which is hereby incorporated by reference in its entirety.

INDUSTRIAL APPLICABILITY

Since the cellulose fiber composite of the present invention has high transparency, high strength, a low water absorption, high transparency, low coloration, and a low haze, and is excellent in optical characteristics, it is suitable in a wide range of applications of displays such as liquid crystal displays, plasma displays, organic EL displays, field emission displays, and rear projection televisions; a substrate and a panel; a substrate for solar cells such as silicon-based solar cells and colorant-sensitized solar cells; window materials for automobiles, window materials for railroad vehicles, window materials for dwelling houses, window materials for offices and factories, and the like.

The invention claimed is:

1. A method for preparing a cellulose fiber assembly, comprising:
    fibrillating cellulose fiber raw materials to obtain fibrillated cellulose fibers in a dispersion medium,
    removing the dispersion medium from the fibrillated cellulose fibers to obtain a cellulose fiber assembly, and
    reacting the cellulose fibers with a reducing agent selected from the group consisting of metal hydride, dithionite, sulfite, bisulfite, thiourea dioxide, formamidinesulfinic acid, hydrazine, and combinations thereof.

2. The method for preparing a cellulose fiber assembly according to claim 1, wherein the cellulose fibers are reacted with the reducing agent subsequent to removing the dispersion medium.

3. The method for preparing a cellulose fiber assembly according to claim 2, further comprising reacting the cellulose fibers with a chemical modifier.

4. The method for preparing a cellulose fiber assembly according to claim 3, wherein the chemical modifier is selected from the group consisting of an acid, an acid anhydride, an alcohol, a halogenation reagent, a cyclic ether, and combinations thereof.

5. The method for preparing a cellulose fiber assembly according to claim 4, wherein the chemical modifier is an acid selected from the group consisting of acetic acid, acrylic acid, methacrylic acid, propanoic acid, butanoic acid, 2-butanoic acid, pentanoic acid, and combinations thereof.

6. The method for preparing a cellulose fiber assembly according to claim 4, wherein the chemical modifier is an acid anhydride selected from the group consisting of acetic anhydride, acrylic anhydride, methacrylic anhydride, propanoic anhydride, butanoic anhydride, 2-butanoic anhydride, pentanoic anhydride, and combinations thereof.

7. The method for preparing a cellulose fiber assembly according to claim 4, wherein the chemical modifier is an isocyanate selected from the group consisting of methyl isocyanate, ethyl isocyanate, propyl isocyanate, and combinations thereof.

8. The method for preparing a cellulose fiber assembly according to claim 4, wherein the chemical modifier is an alkoxysilane selected from the group consisting of methoxysilane, ethoxysilane, and combinations thereof.

9. The method for preparing a cellulose fiber assembly according to claim 4, wherein the chemical modifier is a cyclic ether selected from the group consisting of ethyloxirane, ethyloxethane, and combinations thereof.

10. A cellulose fiber assembly prepared by the method for preparing a cellulose fiber assembly according to claim 1.

11. A cellulose fiber composite comprising the cellulose fiber assembly according to claim 10 and a matrix material.

12. The method for preparing a cellulose fiber assembly according to claim 1, further comprising reacting the cellulose fibers with a chemical modifier.

13. The method for preparing a cellulose fiber assembly according to claim 1, wherein the reducing agent is a metal hydride selected from the group consisting of sodium borohydride, sodium cyanoborohydride, lithium triethylborohydride, lithium tri(sec-butyl)borohydride, potassium tri(sec-butyl)borohydride, lithium borohydride, zinc borohydride, sodium acetoxyborohydride, lithium aluminum hydride, sodium bis(2-methoxyethoxy)aluminum hydride, diborane, diisobutylaluminum hydride, and combinations thereof.

14. The method for preparing a cellulose fiber assembly according to claim 1, wherein the reducing agent is a dithionite selected from the group consisting of sodium dithionite, potassium dithionite, and combinations thereof.

15. A method for preparing a cellulose fiber assembly, comprising:
    fibrillating cellulose fiber raw materials to obtain fibrillated cellulose fibers in a dispersion medium,
    removing the dispersion medium from the fibrillated cellulose fibers to obtain a cellulose fiber assembly,
    reacting the cellulose fibers with a reducing agent, and
    reacting the cellulose fibers with a chemical modifier, wherein the chemical modifier is a halogenation reagent selected from the group consisting of acetyl halides, acryloyl halides, methacryloyl halides, propanoyl halides, butanoyl halides, 2-butanoyl halides, pentanoyl halides, benzoyl halides, naphthoyl halides, and combinations thereof.

16. A method for preparing a cellulose fiber assembly, comprising:
    fibrillating cellulose fiber raw materials to obtain fibrillated cellulose fibers in a dispersion medium,
    removing the dispersion medium from the fibrillated cellulose fibers to obtain a cellulose fiber assembly,
    reacting the cellulose fibers with a reducing agent, and
    reacting the cellulose fibers with a chemical modifier, wherein the chemical modifier is an alcohol selected from the group consisting of methanol, ethanol, propanol, 2-propanol, and combinations thereof.

* * * * *